United States Patent [19]

Wada

[11] Patent Number: 5,446,504
[45] Date of Patent: Aug. 29, 1995

[54] IMAGE SIGNAL PROCESSING APPARATUS HAVING FUNCTION FOR COMPRESSING DYNAMIC RANGE AND CORRECTING COLOR SATURATION

[75] Inventor: Tohru Wada, Tokyo, Japan

[73] Assignee: Olympus Optical Co., Ltd., Tokyo, Japan

[21] Appl. No.: 212,741

[22] Filed: Mar. 14, 1994

[30] Foreign Application Priority Data

Mar. 12, 1993 [JP] Japan ............................ 5-052527
Nov. 2, 1993 [JP] Japan ............................ 5-274598

[51] Int. Cl.$^6$ .................................................. H04N 9/68
[52] U.S. Cl. ............................................ 348/645; 348/646
[58] Field of Search ............... 348/645, 646, 647, 648, 348/655, 673, 678, 679, 686; H04N 9/68

[56] References Cited

U.S. PATENT DOCUMENTS

| | | | |
|---|---|---|---|
| 4,661,841 | 4/1987 | Suzuki ............................ | 348/646 |
| 4,926,247 | 5/1990 | Nagasaki et al. | |
| 4,980,756 | 12/1990 | Cagoni ............................ | 348/712 X |
| 5,317,427 | 5/1994 | Ichikawa ........................ | 358/520 |
| 6,060,060 | 10/1991 | Udagawa et al. ............... | 348/655 |

FOREIGN PATENT DOCUMENTS 5308573 11/1993 Japan .

*Primary Examiner*—Victor R. Kostak
*Assistant Examiner*—Nathan J. Flynn
*Attorney, Agent, or Firm*—Frishauf, Hotz, Goodman, Langer & Chick

[57] ABSTRACT

An input section receives an image signal including signals related to colors to output at least a luminance signal component of the image signal. A compressing section compresses the dynamic range of the luminance signal component from the input section. A setting section obtains a compression coefficient from a relationship between the luminance signal component whose dynamic range is compressed by the compressing section and the luminance signal component from the input section. An operating section executes an operation for compressing dynamic ranges of the signals related to colors included in the image signal in accordance with the compression coefficient obtained by the setting section. A correcting section substantially corrects the color saturation of the signals related to a color included in the image signal while preserving the luminance of the image signal such that the color saturation is more intensively suppressed as the luminance becomes lower.

15 Claims, 22 Drawing Sheets

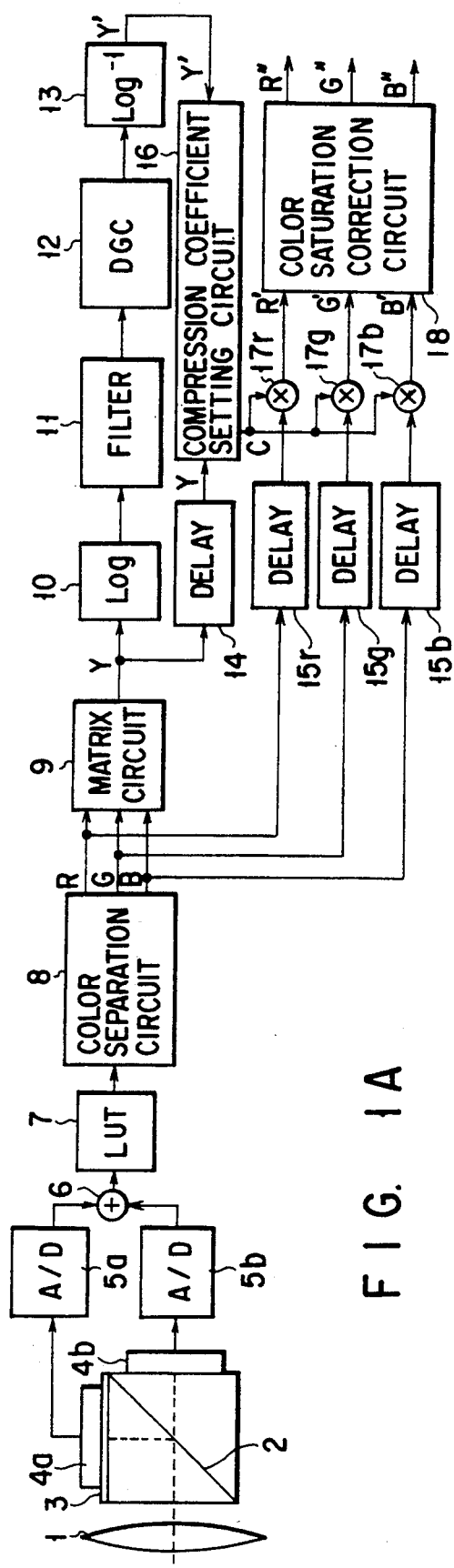
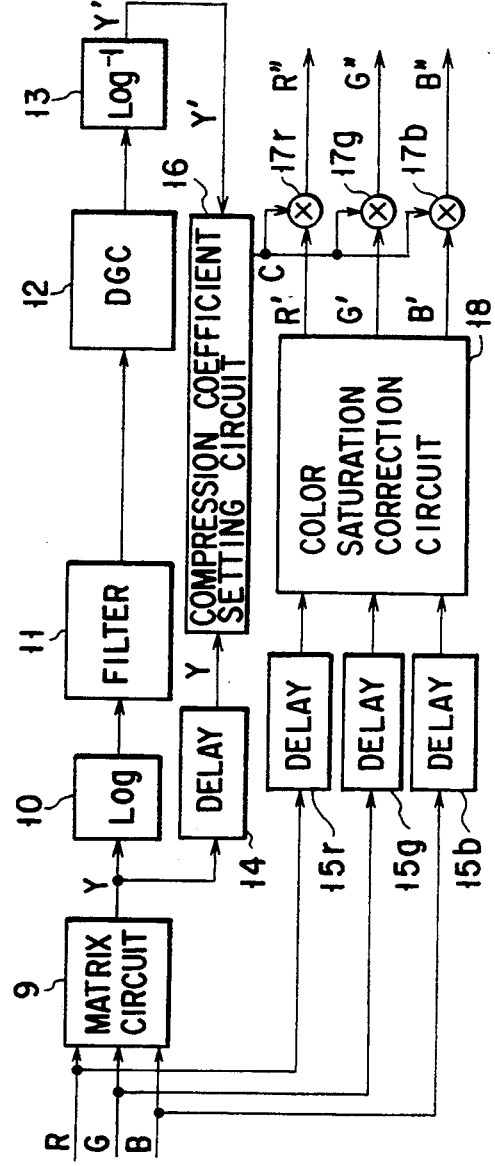
FIG. 1A
FIG. 1B

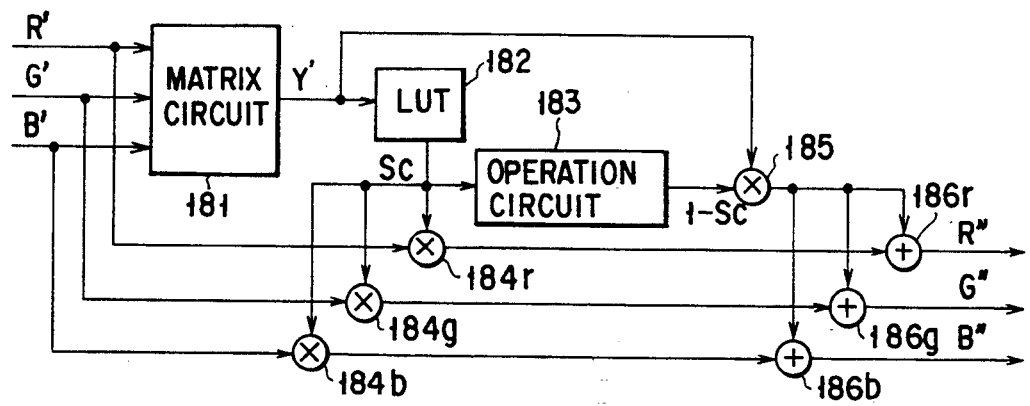
F I G. 2
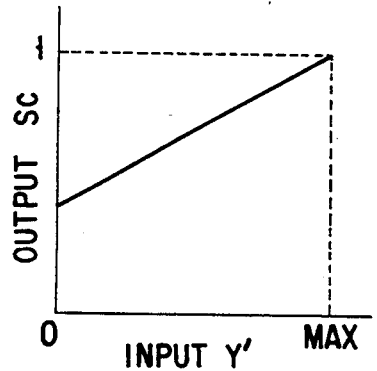
F I G. 3A
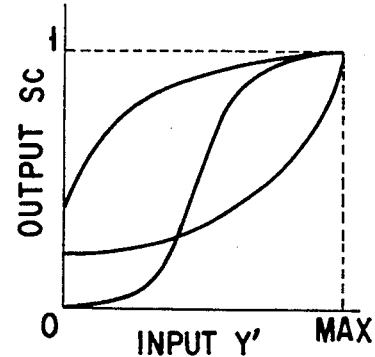
F I G. 3B
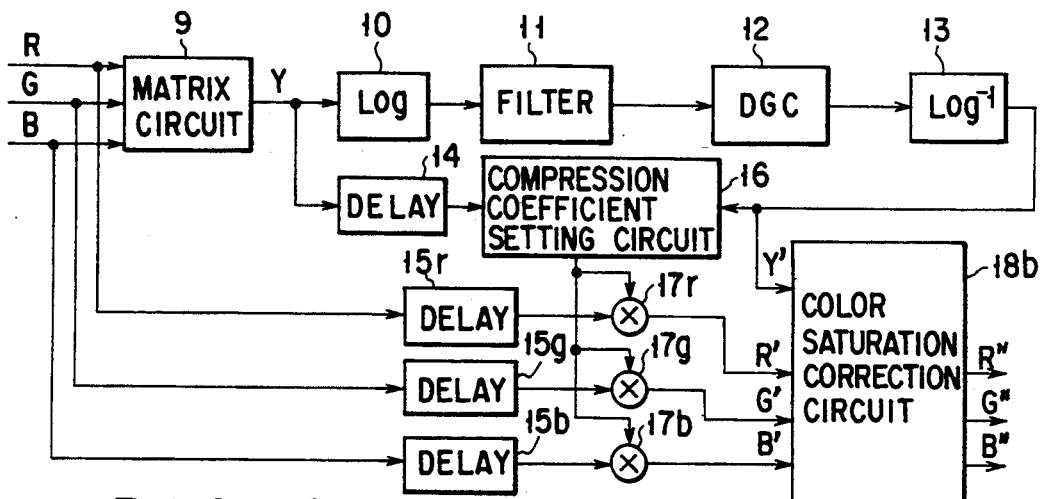
F I G. 4

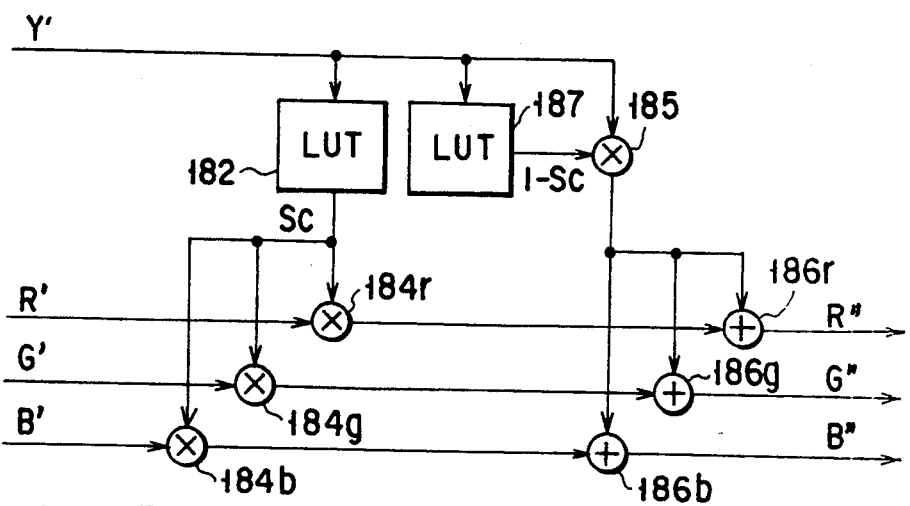
F I G. 5
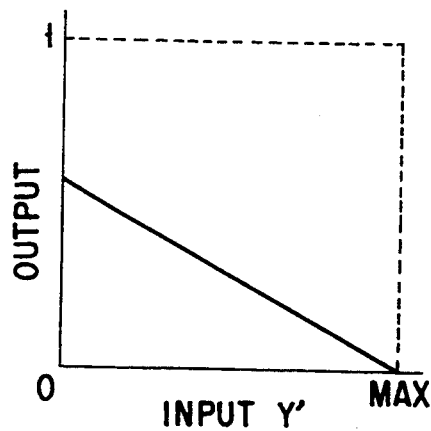
F I G. 6
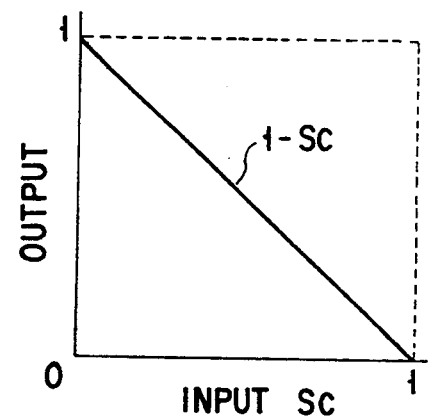
F I G. 8
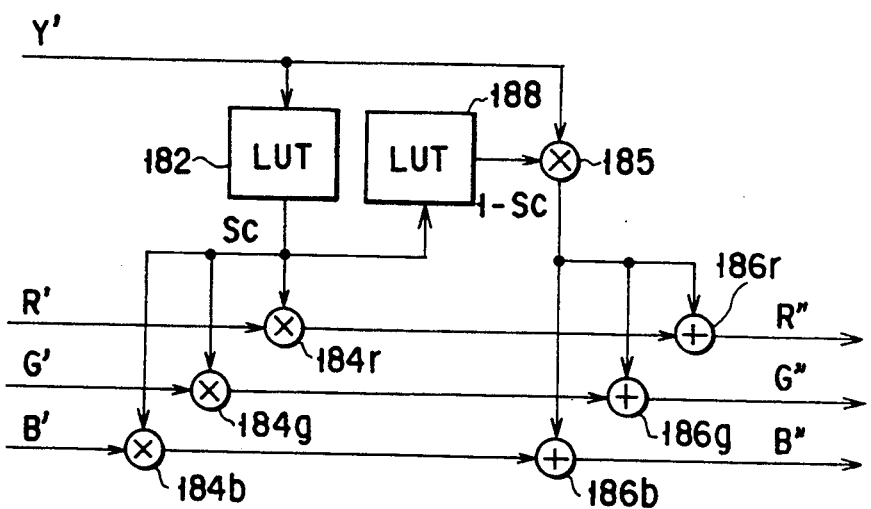
F I G. 7

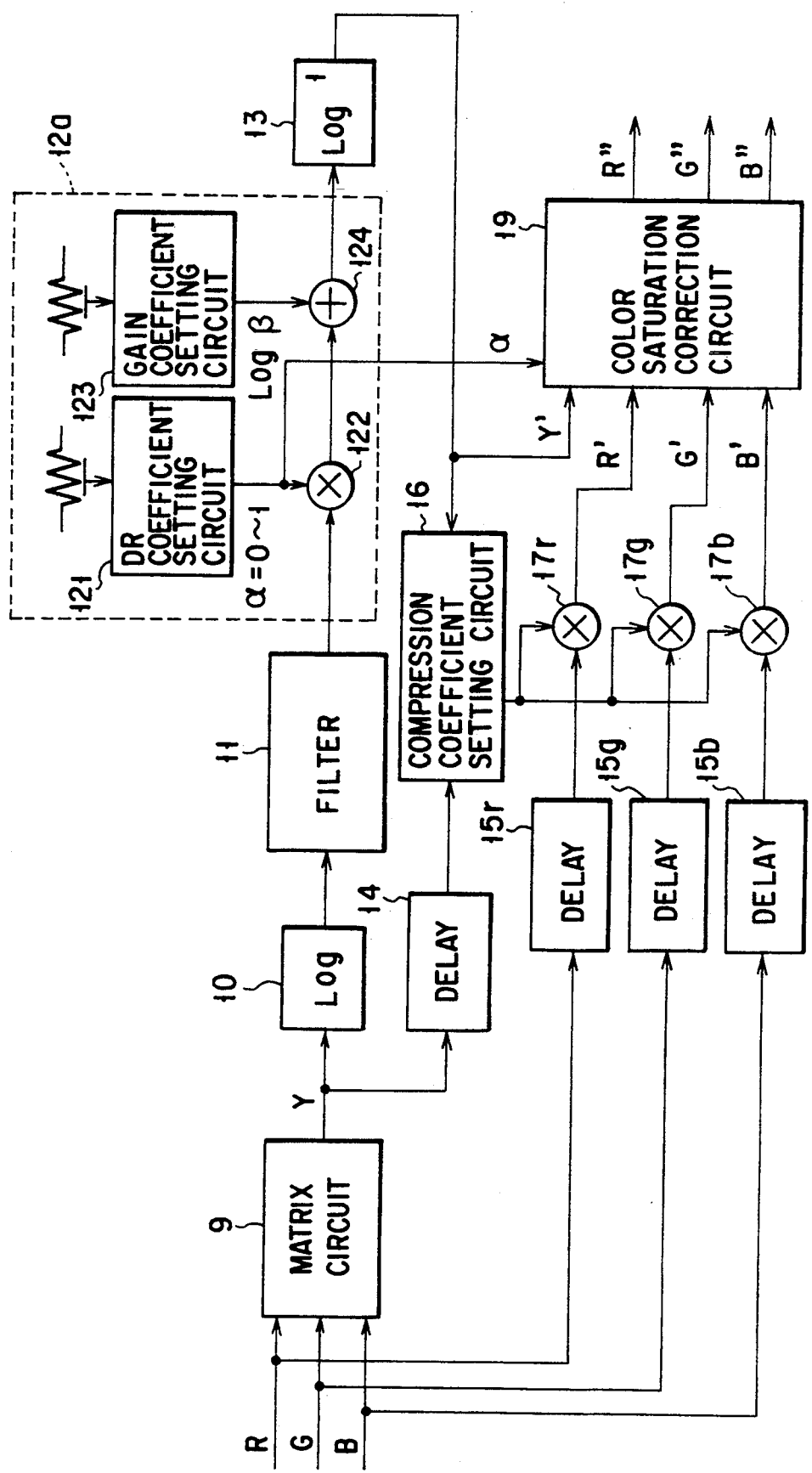
F I G. 12

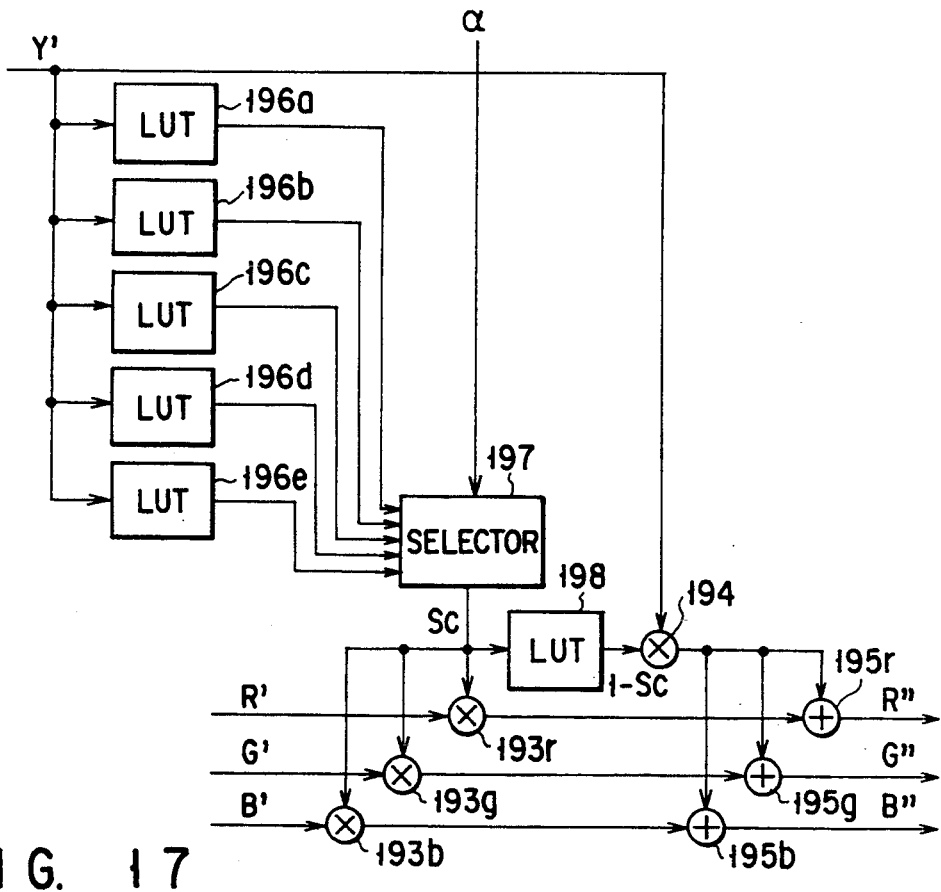
F I G. 17
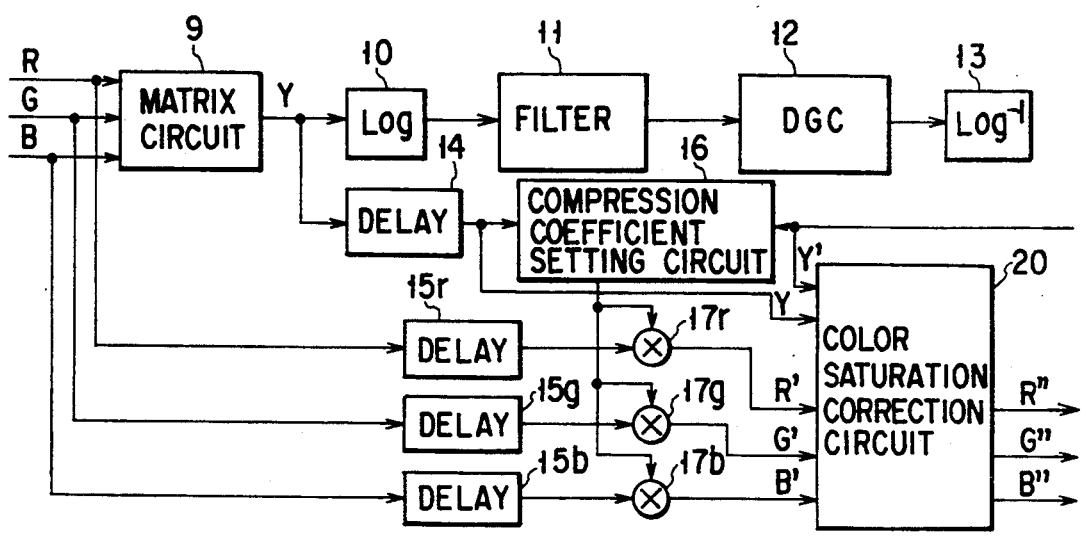
F I G. 18

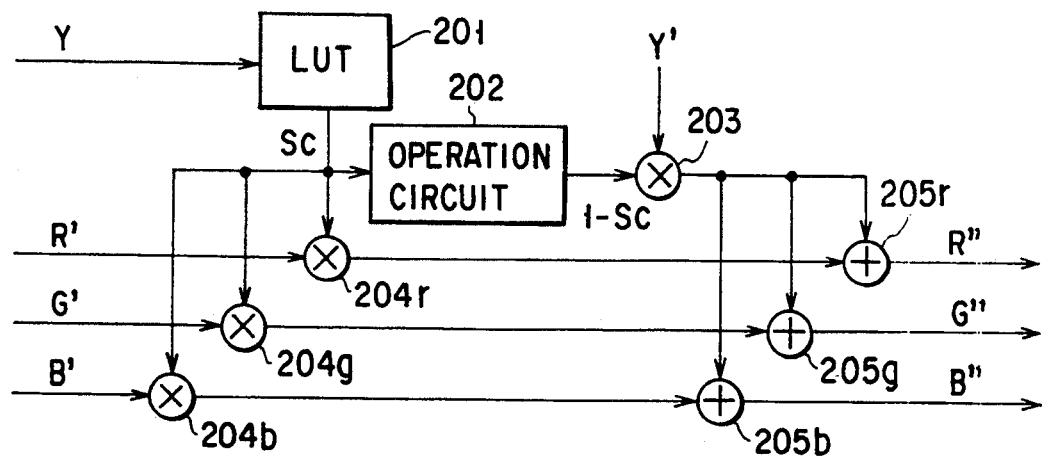
F I G. 19
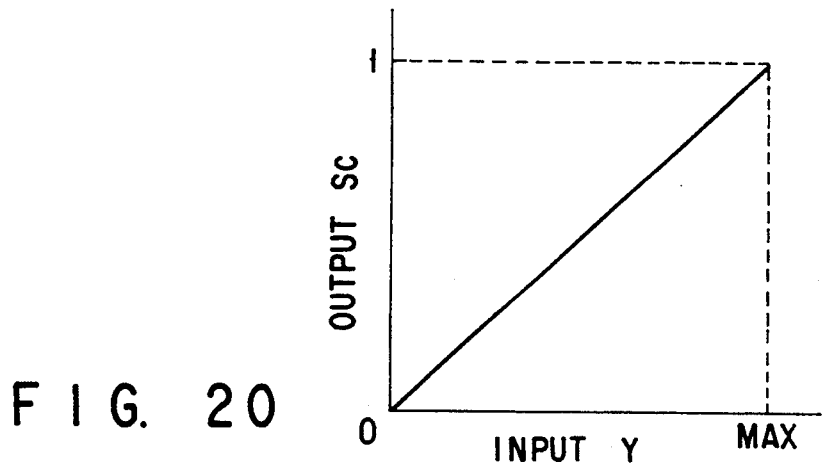
F I G. 20
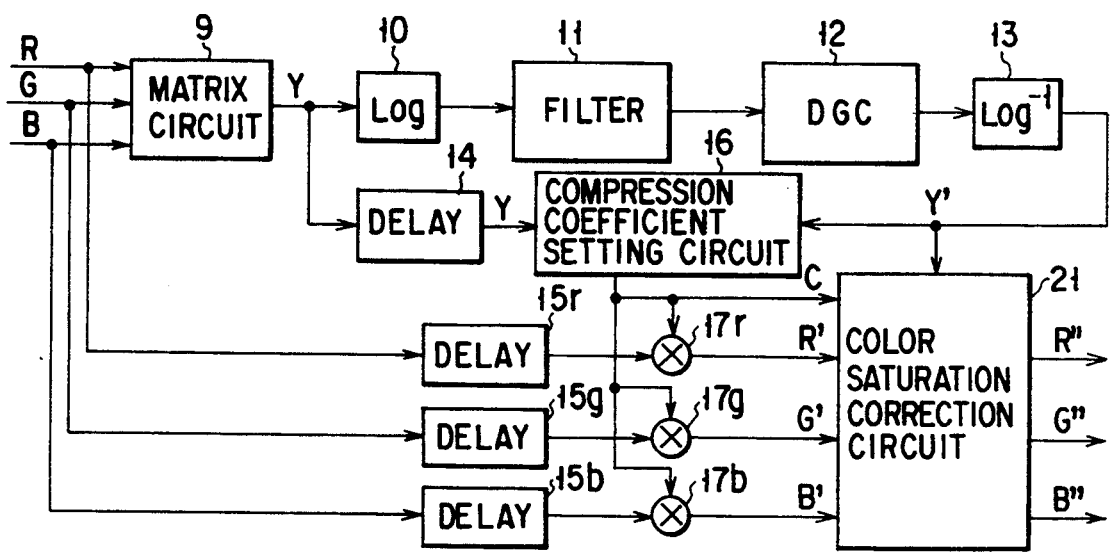
F I G. 21

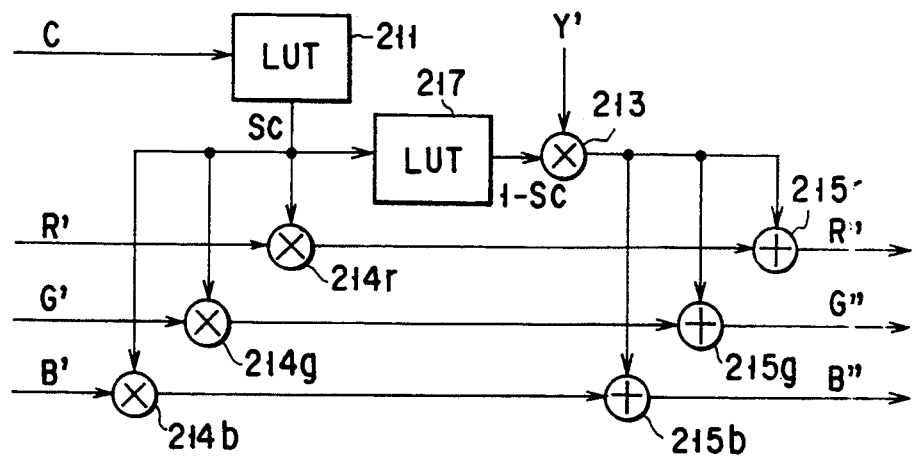
F I G. 25
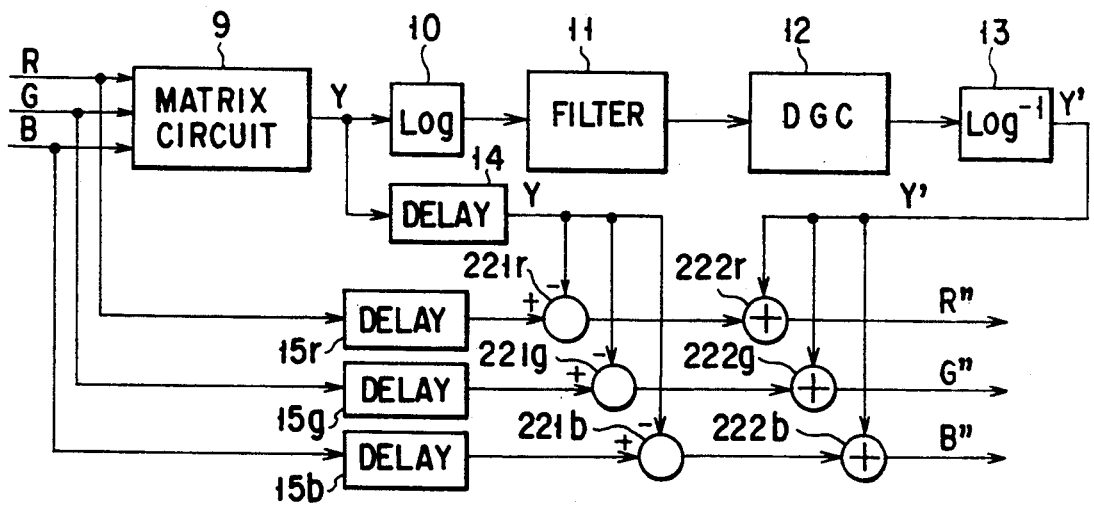
F I G. 26
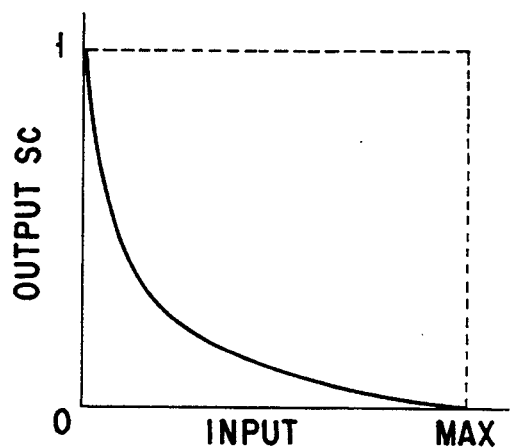
F I G. 27

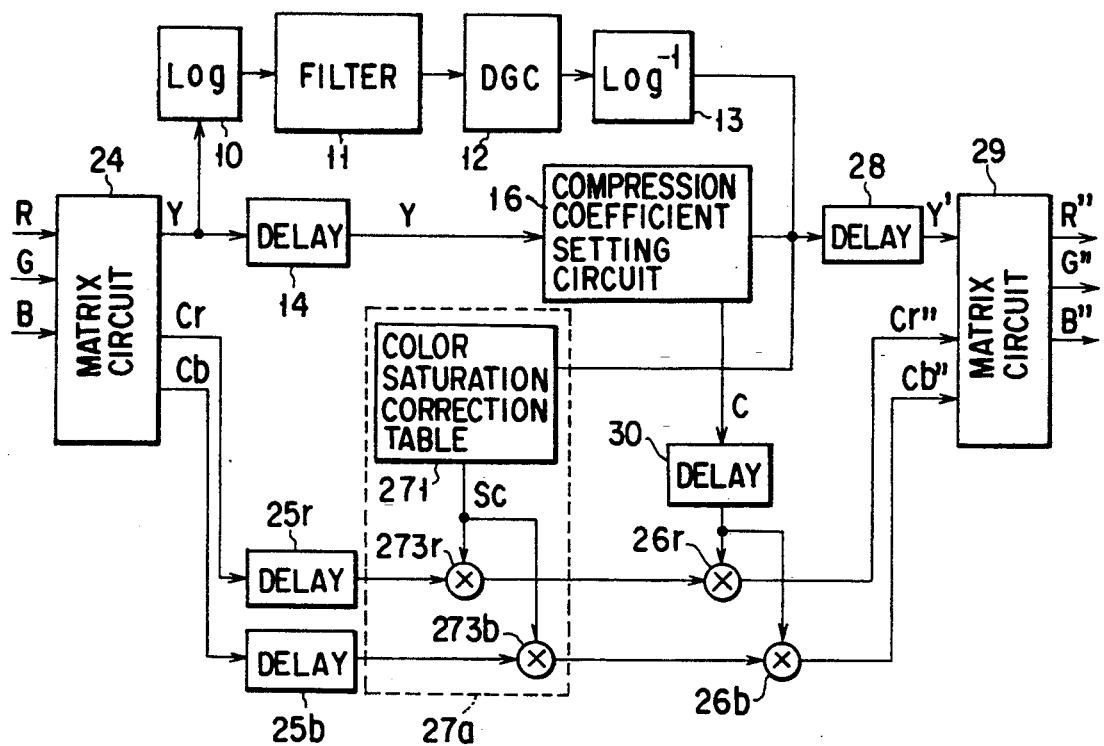
F I G. 31
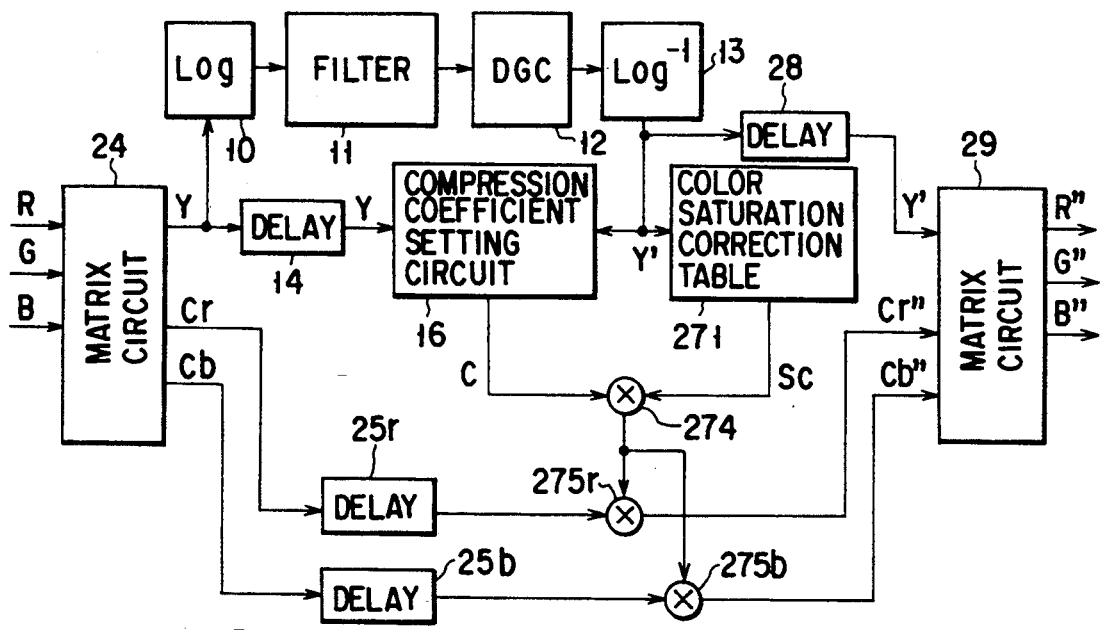
F I G. 32

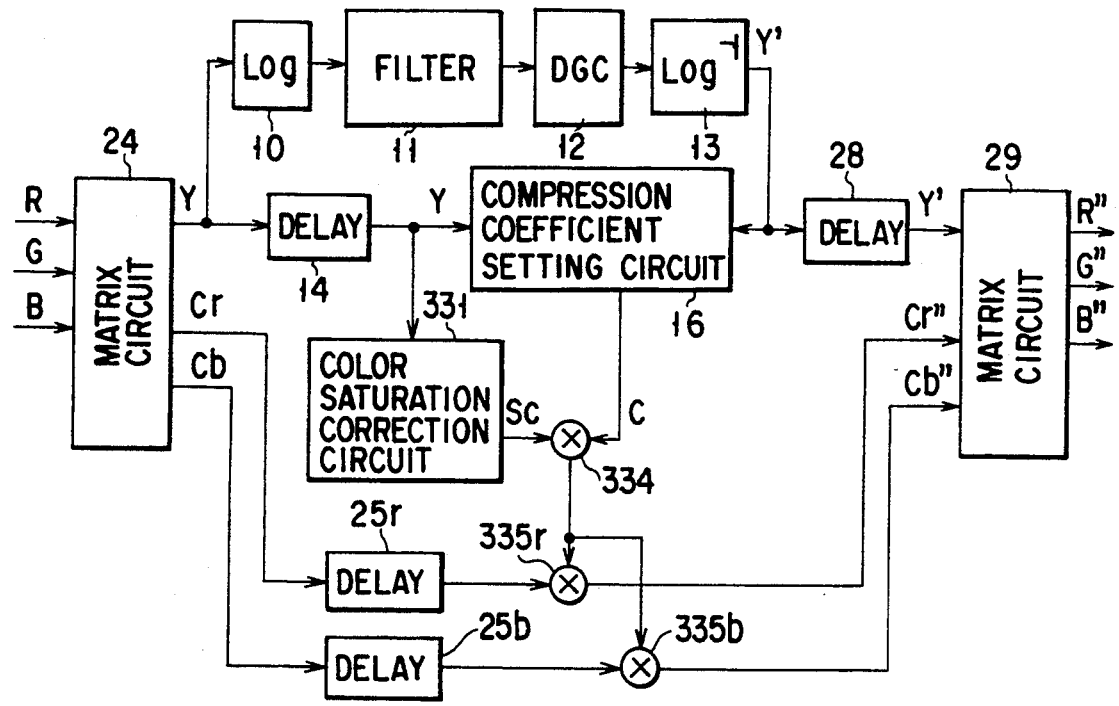
F I G. 41
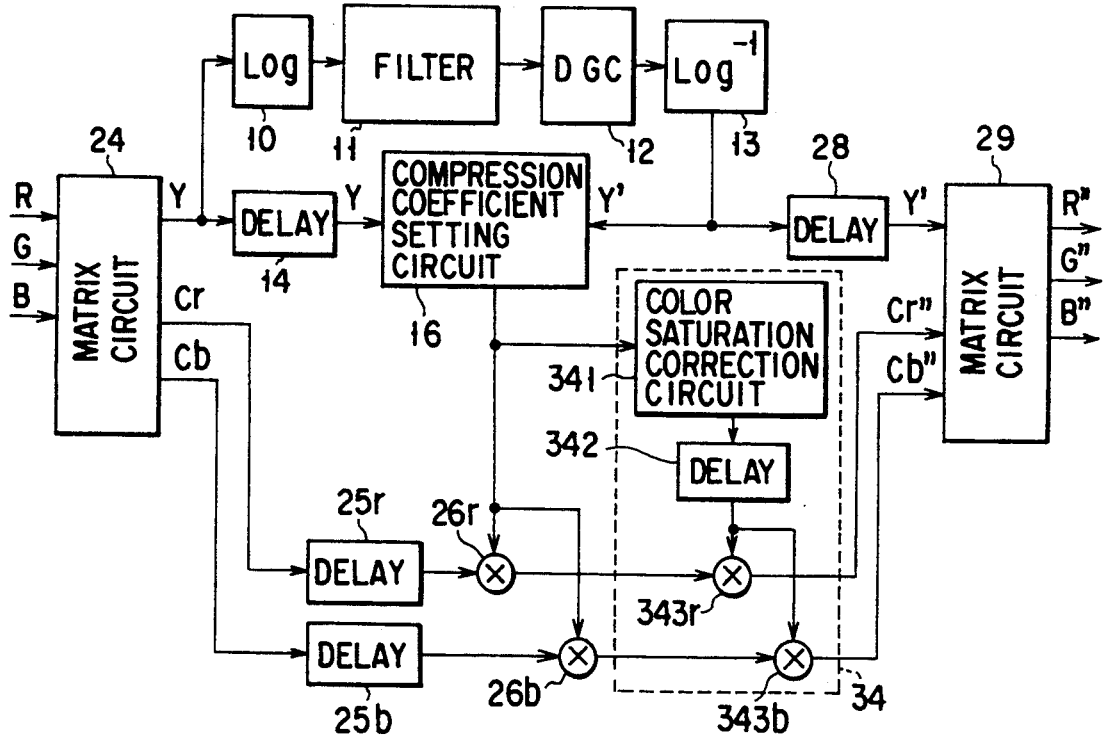
F I G. 42

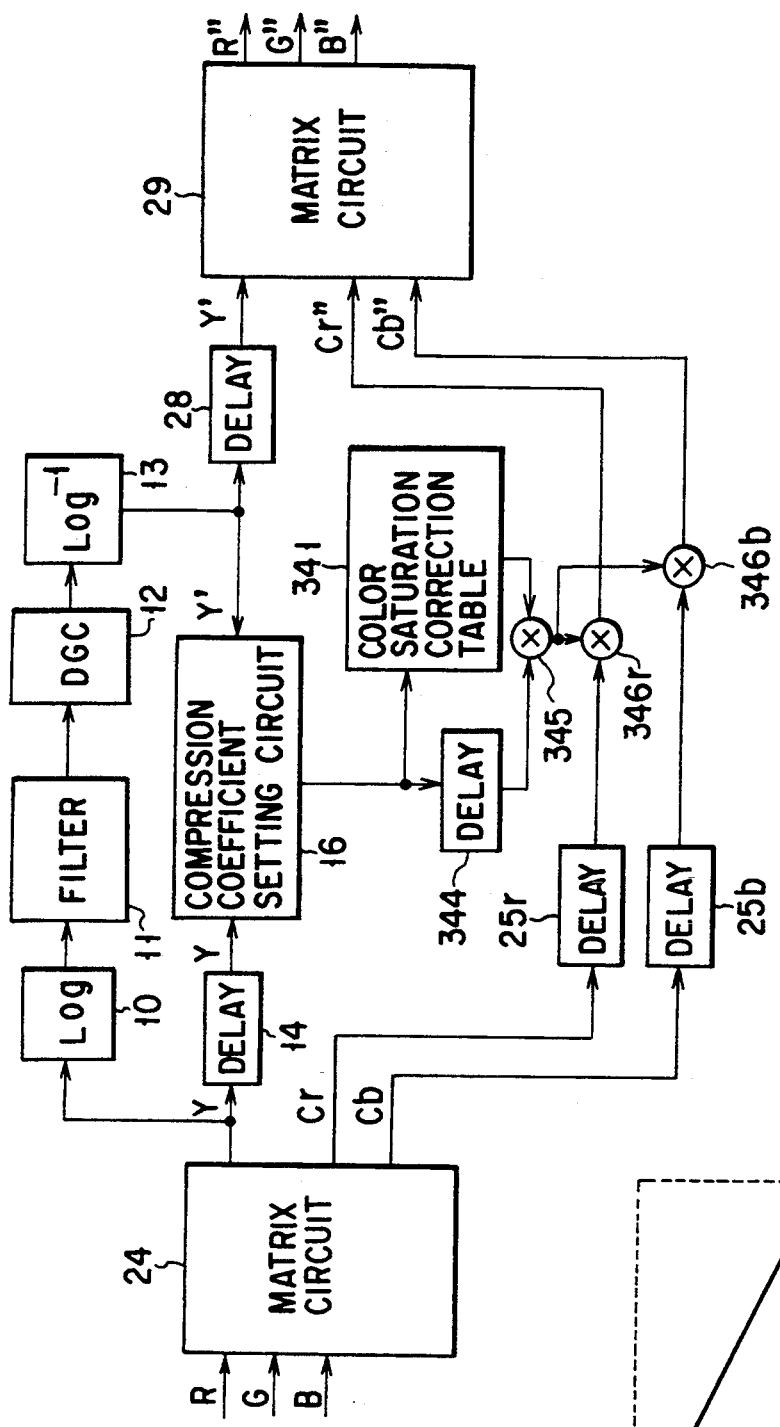
F I G. 44
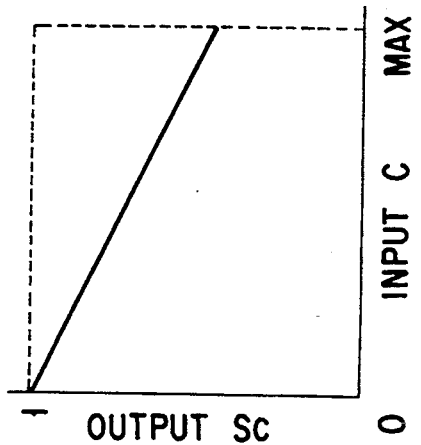
F I G. 43

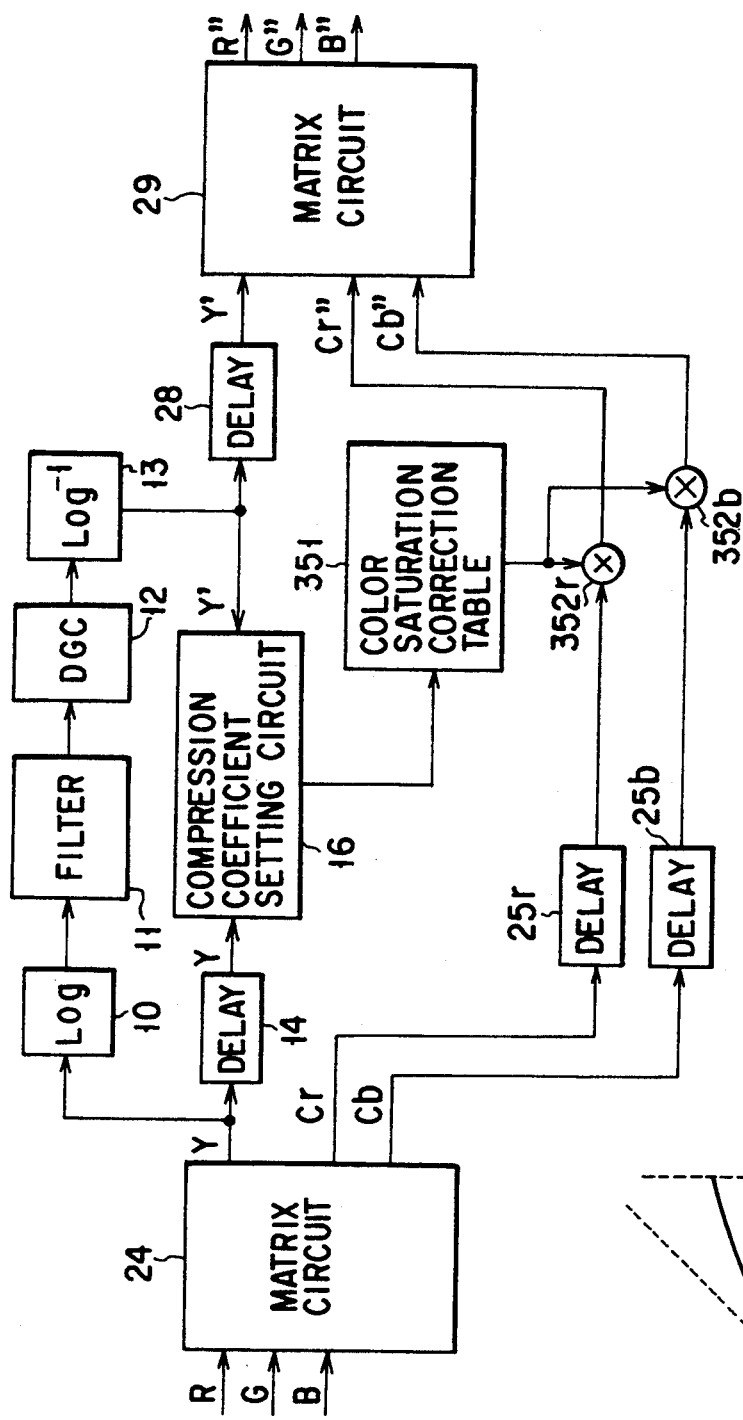
F I G. 45
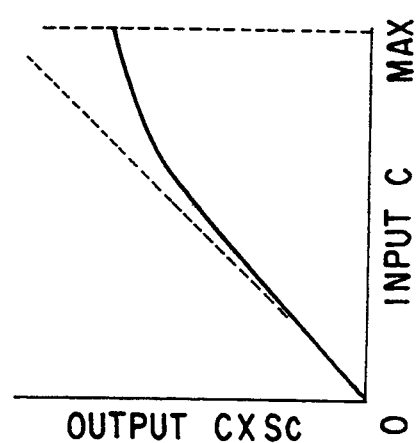
F I G. 46

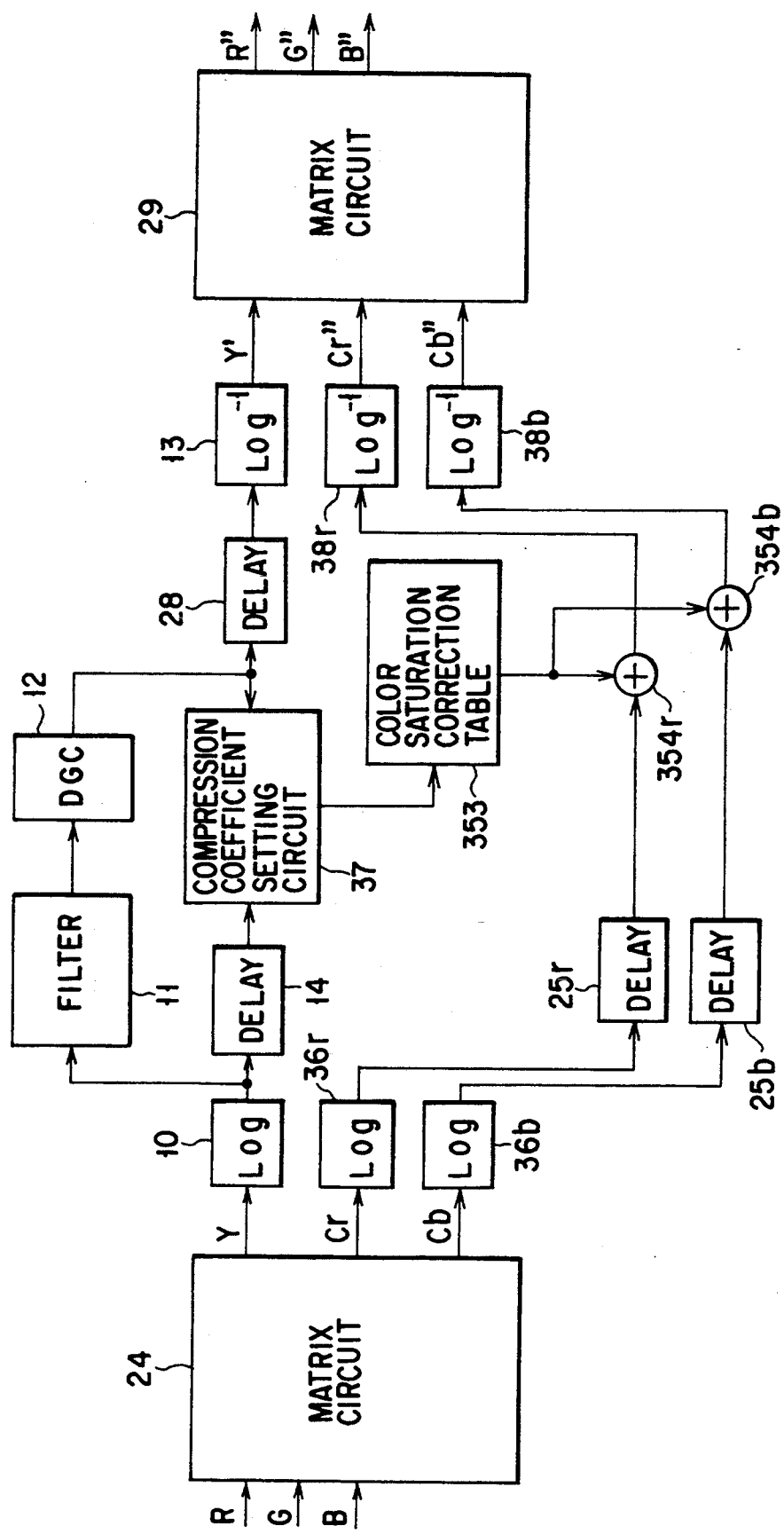
F I G. 47

IMAGE SIGNAL PROCESSING APPARATUS HAVING FUNCTION FOR COMPRESSING DYNAMIC RANGE AND CORRECTING COLOR SATURATION

BACKGROUND OF THE INVENTION

1. Field of the Invention

The present invention generally relates to an image signal processing apparatus and, more particularly, to an image signal processing apparatus for adaptively correcting color saturation in accordance with information obtained from image data.

2. Description of the Related Art

The dynamic range of an image pickup element is generally about 50 to 60 dB, and the dynamic range of a TV (television) monitor is about 45 dB. To the contrary, the dynamic range of a general object is as wide as 80 to 100 dB. As a means for solving this problem, a technique is described in, for example, U.S. Pat. No. 4,926,247 by the assigner of the present application.

According to U.S. Pat. No. 4,926,247, outputs from a pair of color image pickup elements are added for each of chrominance signals R, G, and B. Only a luminance signal obtained by matrix conversion is logarithmically compressed by a logarithmic compressor. Gain adjustment or the like of the output from this logarithmic compressor is performed, and each chrominance signal is multiplied by a ratio of this output to the original luminance signal, thereby displaying an image with a compressed dynamic range without changing the chromaticity.

In display of an image by using the technique described in Jpn. Pat. Appln. KOKAI Publication No. 63-232591, when the compression ratio of the dynamic range is increased, the color saturation of the image data seems to be emphasized although the chromaticity of the image data is not actually changed, resulting in unnatural display.

This phenomenon typically occurs at a dark portion of the image. Therefore, when the color saturation of the whole image is simply adjusted, and the dark portion is saturation-adjusted to obtain a natural color tone, the color saturation at a bright portion is excessively suppressed.

SUMMARY OF THE INVENTION

It is, therefore, an object of the present invention to provide a new and improved image signal processing apparatus having a function for adaptively correcting color saturation, in which, in display of an image, even when the compression ratio of a dynamic range is increased and the color saturation is corrected, an excellent color image can be displayed while preventing apparent emphasis on the color saturation at a dark portion without suppressing the color saturation at a bright portion.

According to an aspect of the present invention, there is provided, an image signal processing apparatus comprising:

input means for inputting an image signal including signals related to colors, the input means including means for outputting a luminance signal in the image signal;

dynamic range compressing means for compressing a dynamic range of the luminance signal from the input means;

compression coefficient setting means for obtaining a compression coefficient from a relationship between an output from the dynamic range compressing means and the luminance signal from the input means;

operating means for executing an operation for compressing dynamic ranges of the signals related to colors in accordance with the compression coefficient from the compression coefficient setting means; and color saturation correcting means for substantially correcting color saturation of the signals related to colors.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1A is a block diagram showing the entire arrangement of an image signal processing apparatus according to the first embodiment of the present invention;

FIG. 1B is a block diagram showing the main part of a modification of the first embodiment;

FIG. 2 is a block diagram showing the detailed arrangement of a color saturation correction circuit in FIG. 1A;

FIG. 3A is a timing chart of an example of the input-output characteristics of an LUT 182 in FIG. 2;

FIG. 3B is a timing chart of another example of the input-output characteristics of the LUT 182 in FIG. 2;

FIG. 4 is a block diagram showing the arrangement of the second embodiment of the present invention;

FIG. 5 is a block diagram showing the detailed arrangement of a color saturation correction circuit 18b in FIG. 4;

FIG. 6 is a timing chart of the input-output characteristics of an LUT 187 in FIG. 5;

FIG. 7 is a block diagram showing the arrangement of a color saturation correction circuit of the third embodiment of the present invention;

FIG. 8 is a timing chart of the input-output characteristics of an LUT 188 in FIG. 7;

FIG. 12 is a block diagram showing the arrangement of the fifth embodiment of the present invention;

FIG. 17 is a block diagram showing the arrangement of a modification in which an operation circuit 192 in FIG. 15 is replaced with an LUT 198;

FIG. 18 is a block diagram showing the arrangement of the seventh embodiment of the present invention;

FIG. 19 is a block diagram showing the detailed arrangement of a color saturation correction circuit 20 in FIG. 18;

FIG. 20 is a timing chart of the input-output characteristics of an LUT 201 in FIG. 19;

FIG. 21 is a block diagram showing the arrangement of the eighth embodiment of the present invention;

FIG. 25 is a block diagram showing the arrangement of a modification in which the operation circuit 212 in FIG. 22 is replaced with an LUT 217;

FIG. 26 is a block diagram showing the arrangement of the ninth embodiment of the present invention;

FIG. 27 is a timing chart of the input-output characteristics for explaining the operation of the ninth embodiment;

FIG. 31 is a block diagram showing the arrangement of the color saturation correction circuit in FIG. 28 and its periphery in a modification of the tenth embodiment;

FIG. 32 is a block diagram showing the arrangement of the eleventh embodiment of the present invention;

FIG. 41 is a block diagram showing the arrangement of the seventeenth embodiment of the present invention;

FIG. 42 is a block diagram showing the arrangement of the eighteenth embodiment of the present invention;

FIG. 43 is a timing chart of the input-output characteristics of a color saturation correction table 341 in FIG. 42;

FIG. 44 is a block diagram showing the arrangement of the nineteenth embodiment of the present invention;

FIG. 45 is a block diagram showing the arrangement of the twentieth embodiment of the present invention;

FIG. 46 is a timing chart of the input-output characteristics of a color saturation correction table 351 in FIG. 45; and FIG. 47 is a block diagram showing the arrangement of the twenty-first embodiment of the present invention.

DETAILED DESCRIPTION OF THE PREFERRED EMBODIMENTS

Figure 9:
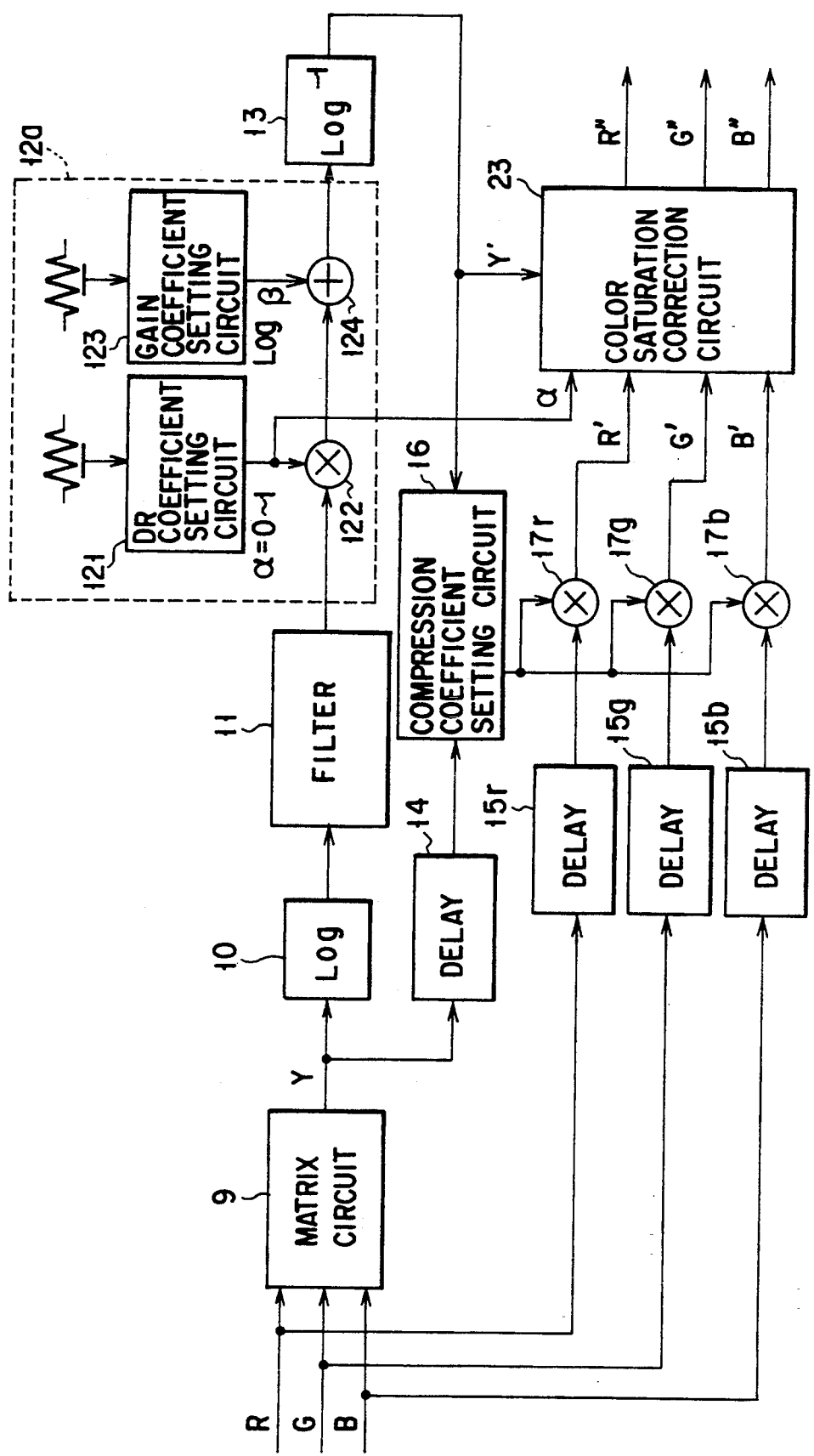
FIG. 9 is a block diagram showing the arrangement of the fourth embodiment of the present invention.

Reference will now be made in detail to the presently preferred embodiments of the invention as illustrated in the accompanying drawings, in which like reference characters designate like or corresponding parts throughout the several drawings.

An embodiment of an image signal processing apparatus of the present invention will be described below with reference to the accompanying drawings.

The first embodiment of the present invention will be described with reference to FIGS. 1 to 3.

FIG. 1A is a block diagram showing the arrangement of the first embodiment.

Referring to FIG. 1A, the image signal processing apparatus is constituted by a photographing optical system 1, a half mirror 2, arranged on the optical axis of the photographing optical system 1, for dividing the optical path, an optical (ND) filter 3 for reducing the light amount of one of the pieces of optical information divided by the half mirror 2, an image pickup element 4a for converting the optical information passing through the optical filter 3 into an analog electrical signal, an image pickup element 4b for converting the other optical information divided by the half mirror 2 into an analog electrical signal, A/D converters 5a and 5b for converting outputs from the image pickup elements 4a and 4b into digital signals, an adder 6 for adding the outputs from the A/D converters 5a and 5b, a look-up table (to be abbreviated as an LUT hereinafter) 7 for correcting the nonlinear input-output characteristics of an added signal from the adder 6 to linear characteristics, and a color separation circuit 8 for separating the corrected signal into chrominance signals R, G, and B.

This image signal processing apparatus also comprises a matrix circuit 9 for generating a luminance signal from outputs from the color separating circuit 8, a logarithmic converter 10 for logarithmically converting the obtained luminance signal, a filter 11 for suppressing the low-frequency components of the logarithmically converted signal, a dynamic range gain control circuit (to be abbreviated as a DGC circuit hereinafter) 12 for adjusting the dynamic range and gain of an output from the filter 11, and an inverse logarithmic converter 13 for performing inverse logarithmic conversion of an output from the DGC circuit 12.

In the first embodiment, an input means for inputting an image signal receives the chrominance signals R, G, and B to output the chrominance signals R, G, and B while a Y signal is output from the matrix circuit 9 (FIG. 1A). The present invention is not limited to this, and a signal of another type may be input to output the Y and chrominance signals. As shown in the tenth embodiment in FIG. 28 (to be described later), the Y and chrominance signals may be output.

This image signal processing apparatus is also constituted by a delay circuit 14 for timing the output from the matrix circuit 9 with an output from the inverse logarithmic converter 13, a compression coefficient setting circuit 16 for dividing an output Y' from the inverse logarithmic converter 13 by an output Y from the delay circuit 14 to output a compression coefficient C, delay circuits 15r, 15g, and 15b for timing the color outputs from the color separation circuit 8 with the output from the compression coefficient setting circuit 16, multipliers 17r, 17g, and 17b for multiplying outputs from the delay circuits 15r, 15g and 15b by the output C from the compression coefficient setting circuit 16, and a color saturation correction circuit 18 for performing saturation correction of outputs R', G', and B' from the adders 17r, 17g, and 17b.

FIG. 2 is a block diagram showing the color saturation correction circuit 18 in detail.

This color saturation correction circuit 18 is constituted by a matrix circuit 181 for obtaining the luminance signal component Y' from the compressed chrominance signals R', G', and B', an LUT 182 for outputting a color saturation correction coefficient in accordance with the luminance signal obtained by the matrix circuit 181, an operation circuit 183 for performing various operations on the basis of the coefficient output from the LUT 182, multipliers 184r, 184g, 184b, and 185, and adders 186r, 186g, and 186b.

The multipliers 184r, 184g, and 184b multiply the compressed chrominance signals R', G', and B' by a color saturation correction coefficient Sc output from the LUT 182. The operation circuit 183 calculates (1−Sc) from the color saturation correction coefficient Sc output from the LUT 182. The multiplier 185 multiplies the Output Y' from the matrix circuit 181 by the output (1−Sc) from the operation circuit 183. The adders 186r, 186g, and 186b add the output from the multiplier 185 to the outputs from the multipliers 184r, 184g, and 184b.

The operation of the first embodiment will be described below with reference to FIG. 1A.

An object image passing through the photographing optical system 1 is divided in two directions by the half mirror 2. One of the divided object images passes through the ND filter 3 and is focused on the image pickup element 4a to be output as an analog signal and converted into a digital signal by the A/D converter 5a. The other of the object images divided by the half mirror 2 passes through the image pickup element 4b and is converted into a digital signal by the A/D converter 5b.

At this point of time, the A/D converter 5a outputs an image signal representing that the dark portion of the object is picked up to become solid black and the bright portion properly is picked up without saturation. On the other hand, the A/D converter 5b outputs an image signal representing that the bright portion is saturated and the dark portion is picked up without becoming black. When these image signals are added by the adder 6, an image signal having information from the dark portion to the bright portion can be obtained. Since the input-output characteristics of this image signal are not linear, the signal is converted by the LUT 7 to have linear characteristics.

The color separation circuit 8 separates the image signal converted by the LUT 7 to be linear into the chrominance signals R, G, and B. The luminance signal Y is extracted from the chrominance signals R, G, and B by the matrix circuit 9. The luminance signal Y' whose dynamic range is compressed is obtained through the logarithmic converter 10, the filter 11, the DGC circuit 12, and the inverse logarithmic converter 13. The compression of the dynamic range of the luminance signal is described in detail in U.S. Pat. No. 4,926,247, and a description thereof will be omitted.

The compression coefficient setting circuit 16 obtains the compression coefficient C=Y'/Y from the output Y' from the inverse logarithmic converter 13 and the luminance signal Y timed by the delay circuit 14. The multipliers 17r, 17g, and 17b multiply the chrominance signals R, G, and B (timed by the delay circuits 15r, 15g, and 15b) by the compression coefficient C to obtain the chrominance signals R', G', and B' chrominance signals whose dynamic ranges are compressed while preserving the chromaticity. The color saturation correction circuit 18 corrects the color saturation of these chrominance signals R', G', and B' to obtain output image signals R'', G'', and B''.

The operation of the color saturation correction circuit 18 as the main part of the first embodiment will be described below with reference to FIG. 2.

The luminance signal component Y' is extracted by the matrix circuit 181 from the R', G', and B' signals input to the color saturation correction circuit 18 to be input to the LUT 182. The multipliers 184r, 184g, and 184b multiply the chrominance signals R', G', and B' by the output Sc from the LUT 182. The operation circuit 183 receives Sc to output (1−Sc). The multiplier 185 multiplies the luminance signal Y' by the output (1−Sc) from the operation circuit 183. The adders 186r, 186g, and 186b add the output from the multiplier 185 to the outputs from the multipliers 184r, 184g, and 184b to output R'', G'', and B''.

The chrominance signals output at this time are as follows.

$$R'' = Sc \times R' + (1 - Sc) \times Y' \quad (1)$$

$$G'' = Sc \times G' + (1 - Sc) \times Y' \quad (2)$$

$$B'' = Sc \times B' + (1 - Sc) \times Y' \quad (3)$$

In this case, only the color saturation can be suppressed without changing the luminance Y'.

As the output Sc from the LUT 182 is smaller, the color saturation is suppressed to be lower. As Sc is larger, the color saturation becomes higher. As for the color saturation correction coefficient Sc, when Sc=0, an achromatic color is obtained. When Sc=1, the original color saturation is preserved.

The input-output characteristics of the LUT 182 represent a monotone increasing function of the output in response to the input, as shown in FIG. 3A. Therefore, the color saturation at a dark portion is more intensively suppressed.

According to the first embodiment, the luminance of the output image signal is not changed, and the color saturation at a high luminance portion is not suppressed. As the luminance becomes lower, the color saturation is more intensively suppressed. Therefore, even when the compression ratio of the dynamic range is increased, an excellent color image can be obtained in which the color saturation at a low luminance portion does not seem to be emphasized.

The input-output characteristics of the LUT 182 represent a linear function in FIG. 3A. However, the present invention is not limited to this, and various characteristics as shown in, e.g., FIG. 3B, can be used as far as they represent a monotone increasing function.

In FIG. 2, only the signals R', G', and B' are input. However, the present invention is not limited to this. For example, when the output from the inverse logarithmic converter 13 in FIG. 1A is used as the luminance signal Y', the matrix circuit 181 can be omitted, thereby obtaining a simpler arrangement.

In FIG. 1A, the color saturation correction circuit 18 is connected to the outputs of the multipliers 17r, 17g, and 17b to correct the color saturation after the dynamic ranges of the chrominance signals are compressed. However, as shown in FIG. 1B, the color saturation correction circuit 18 may be connected to the inputs of the multipliers 17r, 17g, and 17b to correct the color saturation before compression of the dynamic ranges.

In this case, as for the color saturation correction circuit 18 shown in FIG. 2, the input components R'G'and B' can be replaced with R G, and B and the output components R", G", and B" can be replaced with R', G', and B'.

The second embodiment of the present invention will be described below.

FIG. 4 is a block diagram showing another arrangement of the color saturation correction circuit 18 in FIG. 1A.

In the second embodiment to be described below, the arrangement from a photographing optical system 1 to a color separating circuit 8 (none are shown) is the same as in the first embodiment, and a detailed description thereof will be omitted. The same reference numerals as in FIG. 1A denote the same parts in FIG. 4, and a detailed description thereof will be omitted.

The processing section of the image processing apparatus in FIG. 4 is the same as in FIG. 1A except that the arrangement of a color saturation correction circuit 18b is different and, accordingly, an output from an inverse logarithmic converter 13 is added to inputs to the color saturation correction circuit 18b.

FIG. 5 is a block diagram showing the arrangement of the color saturation correction circuit 18b used in the second embodiment.

The color saturation correction circuit 18b is different from the color saturation correction circuit 18 in FIG. 2 in that the matrix circuit 181 and the operation circuit 183 are omitted and an LUT 187 is added. An output Y' from the inverse logarithmic converter 13 is input to LUTs 182 and 187 and a multiplier 185. An output from the LUT 187 is supplied to the multiplier 185.

The operation of the color saturation correction circuit 18b used in the second embodiment will be described below.

The luminance signal Y' compressed and input to the color saturation correction circuit 18b is input to the LUTs 182 and 187. The multipliers 184r, 184g, and 184b multiply chrominance signals R', G', and B' by an output Sc from the LUT 182. On the other hand, the LUT 187 outputs (1−Sc). The multiplier 185 multiplies the luminance signal Y' by the output (1−Sc) from the LUT 187. The adders 186r, 186g, and 186b add the output from the multiplier 185 to the outputs from the multipliers 184r, 184g, and 184b to output R", G", and B".

The input-output characteristics of the LUT 182 represent a monotone increasing function of the output Sc in response to the input Y', as shown in FIG. 3A. To the contrary, the input-output characteristics of the LUT 187 are set to represent a function in which the output decreases with (1−Sc) in response to the input Y', as shown in FIG. 6.

According to the second embodiment, matrix and operation circuits can be omitted in the color saturation correction circuit 18b. Therefore, a simpler circuit arrangement can be obtained, thereby realizing adaptive color saturation correction.

The third embodiment of the present invention will be described below.

FIG. 7 is a block diagram showing the arrangement of a color saturation correction of the third embodiment.

The third embodiment is a modification of the circuit in FIG. 5 and can be replaced with the color saturation correction circuit 18b in FIG. 4. FIG. 7 is different from FIG. 5 in that an LUT 188 for receiving a signal from an LUT 182 is added instead of the LUT 187 for receiving a signal from the inverse logarithmic converter 13. The same reference numerals as in FIG. 5 denote the same parts in FIG. 7, and a detailed description thereof will be omitted.

The operation of the third embodiment will be described with reference to FIG. 7.

A luminance signal Y' is input to the LUT 182. Multipliers 184r, 184g, and 184b multiply chrominance signals R', G', and B' by an output Sc from the LUT 182. The output Sc is also input to the LUT 188. The LUT 188 receives Sc to output (1−Sc). The luminance signal Y' is multiplied by the output (1−Sc) from the LUT 188 in the multiplier 185. Adders 186r, 185g, and 186b add the output from the multiplier 185 to outputs from the multipliers 184r, 184g, and 184b to output R", G", and B".

The input-output characteristics of the LUT 182 represent a monotone increasing function of the output Sc in response to the input Y', as shown in FIG. 3A. To the contrary, the input-output characteristics of the LUT 188 are set to represent a function in which the output decreases with (1−Sc) in response to the input Sc.

According to the third embodiment, matrix and operation circuits can be omitted from the color saturation correction circuit. Therefore, a simpler circuit arrangement can be obtained, thereby realizing adaptive color saturation correction to obtain an excellent color image.

The fourth embodiment in which a color saturation correction coefficient is changed in accordance with the compression ratio of the dynamic range of an image will be described below with reference to FIGS. 9 to 11.

FIG. 9 is a block diagram showing the arrangement of the fourth embodiment.

Referring to FIG. 9, the image signal processing apparatus is constituted by a matrix circuit 9 for generating a luminance signal from signals R, G, and B, a logarithmic converter 10, a filter 11, a DGC circuit 12a for adjusting the dynamic range and gain of an output from the filter 11, an inverse logarithmic converter 13 for performing inverse logarithmic conversion of an output from the DGC circuit 12a, delay circuits 14, 15r, 15g, and 15b, a compression coefficient setting circuit 16 for dividing an output Y' from the inverse logarithmic converter 13 by an output Y from the delay circuit 14 to output a compression coefficient C, multipliers 17r, 17g, and 17b, and a color saturation correction circuit 23 for performing saturation correction of outputs R', G', and B' from the multipliers 17r, 17g, and 17b.

The DGC circuit 12a is constituted by a dynamic range (DR) coefficient setting circuit 121, a multiplier 122 for multiplying an output from the filter 11 by an output $\alpha$ (=0 to 1) from the DR coefficient setting circuit 121, a gain coefficient setting circuit 123, and an adder 124 for adding an output $\log\beta$ from the gain coefficient setting circuit 123 to an output from the multiplier 122.

The color saturation correction circuit 23 receives the outputs R', G', and B' from the multipliers 17r, 17g, and 17b, the output Y' from the inverse logarithmic converter 13, and the output a from the DR coefficient setting circuit 121 in the DGC circuit 12a.

Figure 10:
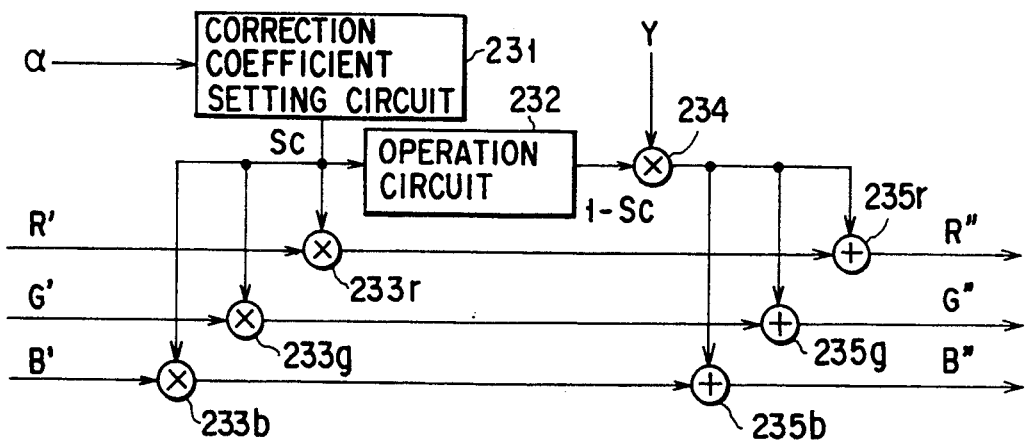
FIG. 10 is a block diagram showing the detailed arrangement of a color saturation correction circuit 231 in FIG. 9.

FIG. 10 is a block diagram showing the detailed arrangement of the color saturation correction circuit 23.

The color saturation correction circuit 23 is constituted by a correction coefficient setting circuit 231 for outputting a color correction coefficient Sc in accordance with the dynamic range coefficient $\alpha$, an operation circuit 232 for receiving the color correction coefficient Sc to output (1−Sc), multipliers 233r, 233g, and 233b for multiplying compressed chrominance signals R', G', and B' by the color saturation correction coefficient Sc output from the correction coefficient setting circuit 231, a multiplier 234 for multiplying the output Y' from the inverse logarithmic converter 13 by the output (1−Sc) from the operation circuit 232, and adders 235r, 235g, and 235b for adding an output from the multiplier 234 to outputs from the multipliers 233r, 233g, and 233b.

The operation of each part of the fourth embodiment will be described below.

Referring to FIG. 9, the luminance signal Y is extracted from the chrominance signals R, G, and B by the matrix circuit 9 to obtain the luminance signal Y', whose dynamic range is compressed, through the logarithmic converter 10, the filter 11, the DGC circuit 12a, and the inverse logarithmic converter 13. The DGC circuit 12a multiplies $\alpha$ and then adds $\log\beta$. Therefore, when the output from the filter 11 is Yf, the compressed luminance signal Y' is represented by equation (4).

$$Y' = \log^{-1}(\alpha \log Y_f + \log\beta)$$
$$= \log^{-1}(\log \beta Y_f^\alpha)$$
$$= \beta Y_f^\alpha$$

(4)

where $\alpha$ represents a value within a range of 0 to 1. Therefore, as the dynamic range a is smaller, the compression ratio of the dynamic range becomes higher. As the compression ratio of the dynamic range becomes higher, the color saturation must be more intensively corrected.

The compression coefficient setting circuit 16 obtains the compression coefficient C=Y'/Y from the output Y' from the inverse logarithmic converter 13 and the luminance signal Y timed by the delay circuit 14. The multipliers 17r, 17g, and 17b multiply the chrominance signals R, G, and B (timed by the delay circuits 15r, 15g, and 15b) by the compression coefficient C to obtain the chrominance signals R', G', and B' whose dynamic ranges are compressed while preserving the chromaticity. The color saturation correction circuit 23 corrects the color saturation of the chrominance signals R', G', and B' to output image signals R", G", and B".

The operation of the color saturation correction circuit 23 as the main part of the fourth embodiment will be described below with reference to FIG. 10.

The dynamic range coefficient a from the DR coefficient setting circuit 121 is input to the correction coefficient setting circuit 231. The correction coefficient setting circuit 231 outputs the color saturation correction coefficient Sc in accordance with the input-output characteristics as shown in FIG. 11. More specifically, as a changes, the magnitude of Sc changes accordingly.

The multipliers 233r, 233g, and 233b multiply the chrominance signals R', G', and B' by the output Sc from the correction coefficient setting circuit 231. The operation circuit 232 receives Sc to output (1−Sc). The multiplier 234 multiplies the luminance signal Y' by the output (1−Sc) from the operation circuit 232. The adders 235r, 235g, and 235b add the output from the multiplier 234 to the outputs from the multipliers 233r, 233g, and 233b to output R", G", and B".

With this arrangement, only the color saturation can be suppressed without changing the luminance Y'.

As the output Sc from the correction coefficient setting circuit 231 is smaller, the color saturation is suppressed lower. As Sc becomes larger, the color saturation becomes higher. As for the color saturation correction coefficient Sc, when Sc=0, an achromatic color is obtained. When Sc=1, the original color saturation is preserved.

Therefore, in order to more intensively suppress the color saturation when the compression ratio of the dynamic range is high, the color saturation correction coefficient Sc must be a small value when a is small.

Figure 11:
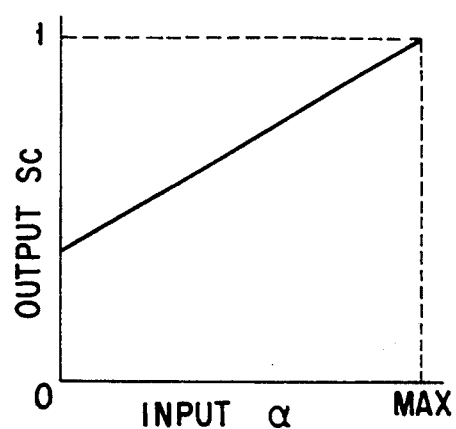
FIG. 11 is a timing chart of the input-output characteristics of an operation circuit 232 in FIG. 10.

The input-output characteristics of the correction coefficient setting circuit 231 represent a monotone increasing function of the output Sc in response to the input $\alpha$, as shown in FIG. 11. Therefore, when the compression ratio of the dynamic range is high, i.e., when a becomes smaller, Sc becomes smaller accordingly. As a result, the color saturation is intensively suppressed.

According to the fourth embodiment, the luminance of the output image signal is not changed. When the compression ratio is not high, the color saturation is not suppressed. As the compression ratio becomes higher, the color saturation is more intensively suppressed. Therefore, a more excellent color image can be displayed.

The input-output characteristics of the correction coefficient setting circuit 231 represent a linear function in FIG. 11. However, the present invention is not limited to this, and various characteristics can be used as far as they represent a monotone increasing function.

The fifth embodiment of the present invention will be described below with reference to FIGS. 12 to 14.

In the fifth embodiment, a color saturation correction coefficient is changed in accordance with the compression ratio of the dynamic range of an image.

FIG. 12 is a block diagram showing the arrangement of the fifth embodiment.

This image signal processing apparatus is constituted by a matrix circuit 9, a logarithmic converter 10, a filter 11, a DGC circuit 12a, an inverse logarithmic converter 13, delay circuits 14, 15r, 15g, and 15b, a compression coefficient setting circuit 16, multipliers 17r, 17g, and 17b, and a color saturation correction circuit 19 for performing saturation correction of outputs R', G', and B' from the multipliers 17r, 17g, and 17b.

The DGC circuit 12a is constituted by a DR coefficient setting circuit 121, a multiplier 122, a gain coefficient setting circuit 123, and an adder 124.

The color saturation correction circuit 19 receives the outputs R', G', and B' from the multipliers 17r, 17g, and 17b, an output Y' from the inverse logarithmic converter 13, and an output a from the DR coefficient setting circuit 121 in the DGC circuit 12a.

Figure 13:
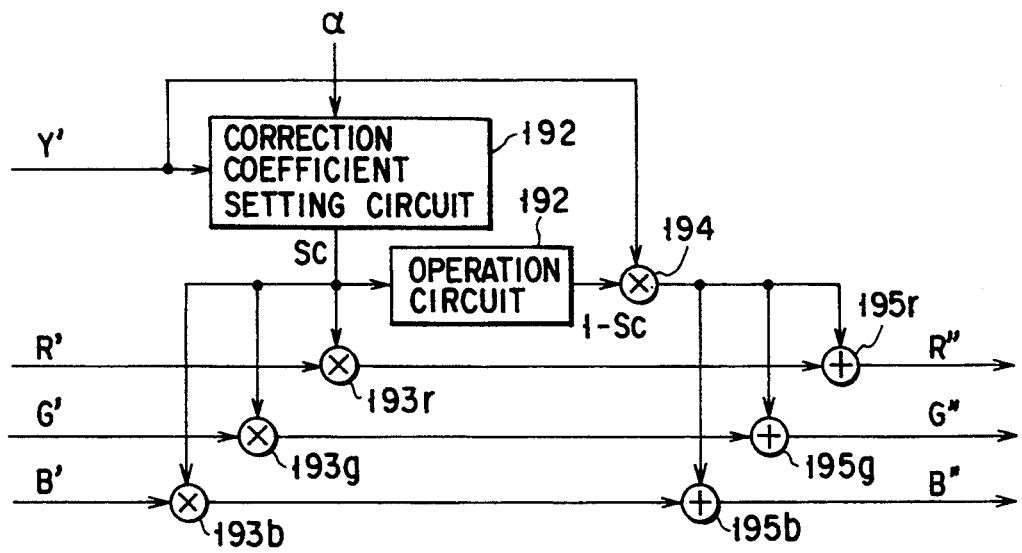
FIG. 13 is a block diagram showing the detailed arrangement of a color saturation correction circuit 19 in FIG. 12.

FIG. 13 is a block diagram showing the detailed arrangement of the color saturation correction circuit 19.

This color saturation correction circuit 19 is constituted by a correction coefficient setting circuit 191 for outputting a color saturation correction coefficient Sc in accordance with the luminance signal Y', an operation circuit 192 for receiving the color saturation coefficient Sc to output (1−Sc), multipliers 193r, 193g, and 193b for multiplying the compressed chrominance signals R', G', and B' by the color saturation coefficient Sc output from the correction coefficient setting circuit 191, a multiplier 194 for multiplying the output Y' from the matrix circuit 9 by the output (1−Sc) from the operation circuit 192, and adders 195r, 195g, and 195b for adding an output from the multiplier 194 to outputs from the multipliers 193r, 193g, and 193b.

The operation of each part of the fifth embodiment will be described below.

Referring to FIG. 12, a luminance signal Y is extracted from the chrominance signals R, G, and B by the matrix circuit 9 to obtain the luminance signal Y', whose dynamic range is compressed, through the logarithmic converter 10, the filter 11, the DGC circuit 12a, and the inverse logarithmic converter 13. The DGC circuit 12a multiplies a and then adds log$\beta$. Therefore, when the output from the filter 11 is $Y_f$, the compressed luminance signal Y' is represented by the above equation (4).

In equation (4), a is a value within a range of 0 to 1. Therefore, as the dynamic range coefficient $\alpha$ is smaller, the compression ratio of the dynamic range becomes higher. As the compression ratio of the dynamic range becomes higher, the color saturation must be more intensively corrected.

The compression coefficient setting circuit 16 obtains a compression coefficient C=Y'/Y from the output Y' from the inverse logarithmic converter 13 and the luminance signal Y timed by the delay circuit 14. The multipliers 17r, 17g, and 17b multiply the chrominance signals R, G, and B (timed by the delay circuits 15r, 15g, and 15b) by the compression coefficient C to obtain the chrominance signals R', G', and B' whose dynamic ranges are compressed while preserving the chromaticity. The color saturation correction circuit 19 corrects the color saturation of the chrominance signals R', G', and B' to obtain signals R'', G'', and B''.

The operation of the color saturation correction circuit 19 as the main part of the fifth embodiment will be described below with reference to FIGS. 13 and 14.

The luminance signal Y' and the dynamic range coefficient $\alpha$ are input to the correction coefficient setting circuit 191. The correction coefficient setting circuit 191 calculates the color correction coefficient Sc in accordance with the following equation (5).

$$Sc = (1-\alpha) \times Y' + \alpha \quad (5)$$

Figure 14:
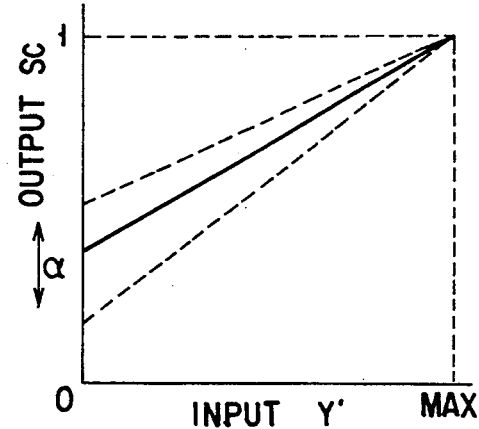
FIG. 14 is a timing chart of the input-output characteristics of an operation circuit 192 in FIG. 13.

In this case, input-output characteristics as shown in FIG. 14 are obtained. More specifically, when a changes, the magnitude of Sc changes accordingly.

The multipliers 193r, 193g, and 193b multiply the chrominance signals R', G', and B' by the output Sc from the correction coefficient setting circuit 191. The operation circuit 192 receives Sc to output (1−Sc). The multiplier 194 multiply the luminance signal Y' by the output (1−Sc) from the operation circuit 192. The adders 195r, 195g, and 195b add the output from the multiplier 194 to outputs from the multipliers 193r, 193g, and 193b to output R'', G'', and B''.

With this arrangement, only the color saturation can be suppressed without changing the luminance Y'.

As the output Sc from the correction coefficient setting circuit 191 is smaller, the color saturation is suppressed lower. As the output Sc becomes larger, the color saturation becomes higher. As for the color saturation coefficient Sc, when Sc=0, an achromatic color is obtained, and when Sc=1, the original color saturation is preserved.

Therefore, in order to more intensively suppress the color saturation at a dark portion when the compression ratio of the dynamic range is high, the color saturation coefficient Sc must be a small value when the luminance signal and a are small.

The input-output characteristics of the correction coefficient setting circuit 191 represent a monotone increasing function of the output in response to the input, as shown in FIG. 14. For this reason, the color saturation at a dark portion is more intensively suppressed. When the input is 0, the value of Sc is equal to the dynamic range coefficient $\alpha$. Therefore, when the compression ratio of the dynamic range is high, i.e., when a is small, Sc becomes small throughout the input. As a result, the color saturation is intensively suppressed throughout the input.

As described above, according to the fifth embodiment, the luminance of the output image signal is not changed, and the color saturation at a high luminance portion is not suppressed. As the luminance becomes lower, the color saturation is more intensively suppressed. Even when the compression ratio of the dynamic range is increased, the color saturation at a low luminance portion does not seem to be emphasized. When the compression ratio does not so increase, the color saturation is less intensively suppressed as a whole. As a result, a more excellent color image can be displayed.

The input-output characteristics of the correction coefficient setting circuit 191 represent a linear function in FIG. 14. However, the present invention is not limited to this, and various characteristics can be used as far as they represent a monotone increasing function.

In the fifth embodiment, when the input is 0, the value of Sc is equal to the dynamic range coefficient $\alpha$. However, a function in which Sc is proportional to $\alpha$ or a function of higher degree of $\alpha$ may also be used.

The sixth embodiment in which no correction coefficient setting circuit is used will be described below with reference to FIGS. 15 and 16.

The sixth embodiment is a modification of FIG. 13 and can be replaced with the color saturation correction circuit 19 in FIG. 12.

The arrangement of the sixth embodiment will be described with reference to FIG. 15.

A luminance signal Y' is input to LUTs 196a to 196e. Outputs from the LUTs 196a to 196e are received by a selector 197. The selector 197 uses a dynamic range coefficient α as a selection signal to switch the outputs from the LUTs 196a to 196e in accordance with the value of α. Multipliers 193r, 193g, and 193b multiply chrominance signals R', G', and B' by the outputs from the LUTs 196a to 196e.

An output Sc from the selector 197 is simultaneously received by an operation circuit 192. The operation circuit 192 receives Sc to output (1−Sc). A multiplier 194 multiplies the luminance signal Y' by the output (1−Sc) from the operation circuit 192. Adders 195r, 195g, and 195b add the output from the multiplier 194 to outputs from the multipliers 193r, 193g, and 193b to output R'', G'', and B''.

Figure 16:
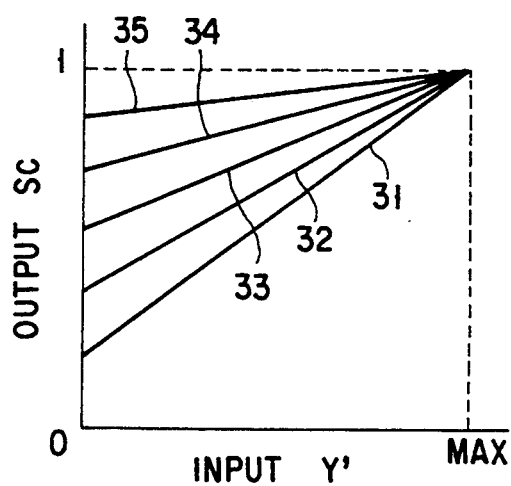
FIG. 16 is a timing chart of the input-output characteristics of LUTs 196a to 196e in FIG. 15.

FIG. 16 is a timing chart of the input-output characteristics of the LUTs 196a to 196e. Referring to FIG. 16, characteristics represented by a line 31 correspond to the LUT 196a; 32, the LUT 196b; 33, the LUT 196c; 34, the LUT 196d; and 35, the LUT 196e. Color saturation suppression is most intensive in the LUT 196a and is weakened in an order of the LUT 196b to the LUT 196e.

The selector 197 selects an LUT for intensively suppressing the color saturation when the compression ratio of the dynamic range is high, i.e., when the value of α is small. The selector 197 selects an LUT for less intensively suppressing the color saturation when the value of α is large.

According to the sixth embodiment, the luminance of the output image signal is not changed, and the color saturation at a high luminance portion is not suppressed. As the luminance becomes lower, the color saturation is more intensively suppressed. Therefore, even when the compression ratio of the dynamic range is increased, the color saturation at a low luminance portion does not seem to be emphasized. When the compression ratio is not high, the color saturation is less intensively suppressed as a whole, so that a more excellent color image can be displayed.

Figure 15:
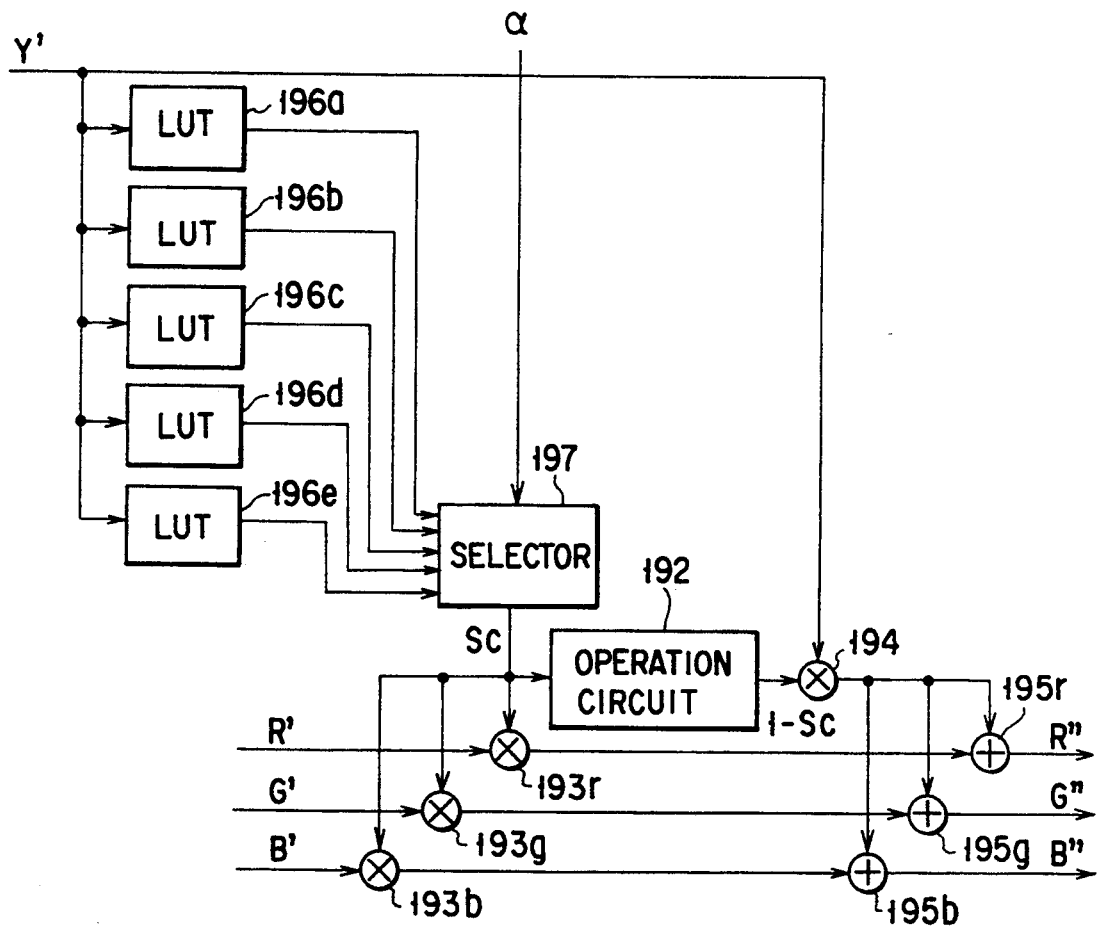
FIG. 15 is a block diagram showing the arrangement of a color saturation correction circuit of the sixth embodiment of the present invention.

The operation circuit 192 in FIG. 15 can be replaced with an LUT 198, as shown in FIG. 17.

The seventh embodiment of the present invention will be described below with reference to FIGS. 18 to 20.

FIG. 18 is a block diagram showing another arrangement of a color saturation correction circuit. FIG. 18 is a modification of FIG. 5 and almost the same as in FIG. 5. The arrangement of a color saturation correction circuit 20 is however different and, accordingly, an output Y from a delay circuit 14 is added to inputs to the color saturation correction circuit 20. The same reference numerals as in FIG. 5 denote the same parts in FIG. 18, and a detailed description thereof will be omitted.

The color saturation correction circuit 20 used in the seventh embodiment will be described with reference to FIG. 19.

The luminance signal Y input to the color saturation correction circuit 20 before compression is input to an LUT 201. Multipliers 204r, 204g, and 204b multiply chrominance signals R', G', and B' by an output Sc from the LUT 201. An operation circuit 202 receives the output Sc from the LUT 201 to output (1−Sc). A multiplier 203 multiplies a compressed luminance signal Y' by the output (1−Sc) from the operation circuit 202. Adders 205r, 205g, and 205b add the output from the operation circuit 202 to outputs from the multipliers 204r, 204g, and 204b to output R'', G'', and B''.

The input-output characteristics of the LUT 201 represent a monotone increasing function of the output Sc in response to the input, as shown in FIG. 20. When the dynamic range of the input is wide, data having smaller values with respect to the maximum value of the data are present in output data, and the compression ratio must be increased. To the contrary, when the dynamic range is narrow, data having values smaller than a predetermined value are not present, and the compression ratio is decreased. On the other hand, a dark portion at a high compression ratio corresponds to a portion having a small input value before compression. Therefore, when the color saturation coefficient Sc is set with respect to the luminance signal Y before compression as shown in FIG. 20, the color saturation at a dark portion can be suppressed when the compression ratio is high.

As described above, according to the seventh embodiment, the color saturation coefficient can be determined regardless of the compression ratio. A simpler circuit arrangement without a complicated coefficient setting circuit can be obtained, thereby realizing adaptive color saturation correction.

In the seventh embodiment, the input-output characteristics of the LUT 201 represent a linear function. However, a function of higher degree, exponential function, or logarithmic function may also be used.

As is apparent, the operation circuit 202 may be constituted by an LUT.

FIG. 21 is a block diagram showing the eighth embodiment in which a color saturation correction circuit having an arrangement different from those of the above embodiments is used.

The eighth embodiment is a modification of FIG. 5 and has almost the same arrangement as in FIG. 5 except that the arrangement of a color saturation correction circuit 21 is changed and, accordingly, an output C=Y'/Y from a compression coefficient setting circuit 16 is added to inputs to the color saturation correction circuit 21. The same reference numerals as in FIG. 5 denote the same parts in FIG. 21, and a detailed description thereof will be omitted.

The color saturation correction circuit 21 used in the eighth embodiment will be described below with reference to FIG. 22.

The output C from the compression coefficient setting circuit 16 to the color saturation correction circuit 21 is input to an LUT 211. Multipliers 214r, 214g, and 214b multiply chrominance signals R', G', and B' by an output Sc from the LUT 211. An operation circuit 212 receives the output Sc from the LUT 211 to output (1−Sc). A multiplier 213 multiplies a compressed luminance signal Y' by the output (1−Sc) from the operation circuit 212. Adders 215r, 215g, and 215b add an output from the multiplier 213 to outputs from the multipliers 214r, 214g, and 214b to output R'', G'', and B''.

Figure 23:
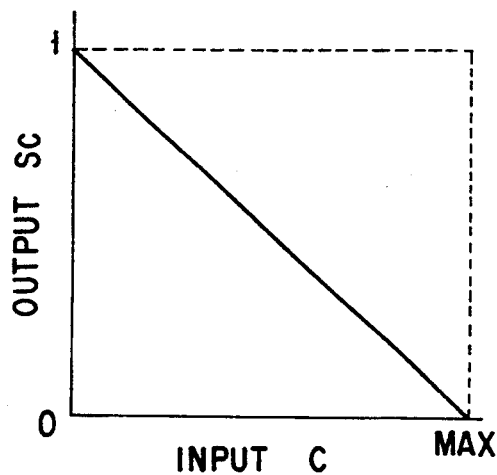
FIG. 23 is a timing chart of the input-output characteristics of an LUT 211 in FIG. 22.

The input-output characteristics of the LUT 211 represent a monotone decreasing function of the output Sc in response to the input C=Y'/Y, as shown in FIG. 23.

When the dynamic range of the input is wide, data having smaller values with respect to the maximum value of the data are present in output data, and the compression ratio must be increased. At this time, the compression coefficient C=Y'/Y, which is a ratio of a luminance signal Y before compression to a compressed luminance signal Y' in image data having a small value, becomes a large value. In image data having a large value, C=Y'/Y becomes a small value. To the contrary, when the dynamic range is narrow and the compression ratio is decreased, C=Y'/Y becomes a small value throughout the input.

Therefore, when the color saturation correction coefficient Sc is set with respect to C=Y'/Y, which is the ratio of the luminance signal Y before compression to the compressed luminance signal Y', as shown in FIG. 23, the color saturation at a dark portion can be suppressed at a high compression ratio.

According to the eighth embodiment, the color saturation correction coefficient can be determined in accordance with the compression ratio of each pixel, thereby realizing proper color saturation correction.

In the eighth embodiment, the input-output characteristics of the LUT 211 represent a linear function. However, a function of higher degree, exponential function, or logarithmic function may also be used.

Figure 24:
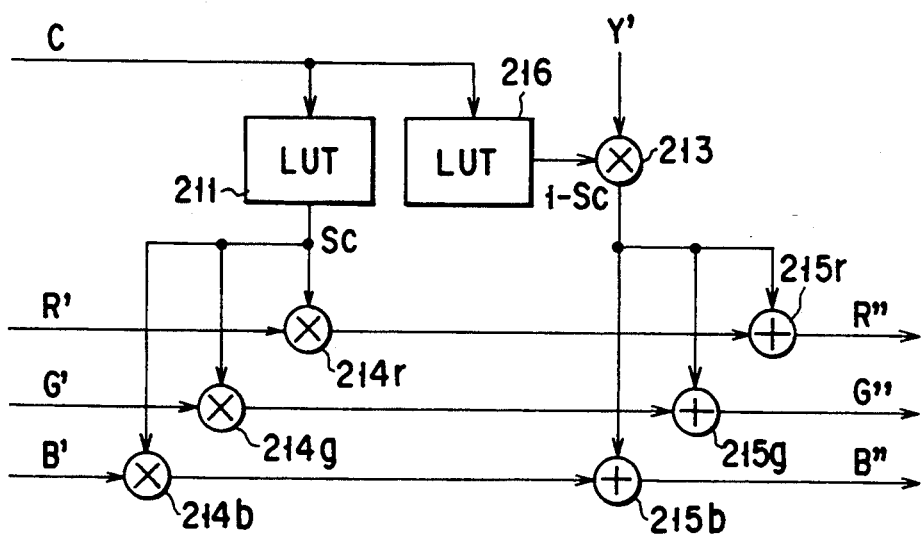
FIG. 24 is a block diagram showing the arrangement of a modification in which an operation circuit 212 in FIG. 22 is not used.

In the eighth embodiment, the operation circuit 212 is used to obtain (1−Sc). However, for example, as shown in FIG. 24, an LUT 216 may also be used. In this case, the LUT 216 receives C=Y'/Y, and its output characteristics are set to be (1−Sc) in correspondence with the output Sc from the LUT 211. This arrangement can provide the same effect.

As shown in FIG. 25, an LUT 217 may also be used. The LUT 217 receives the output Sc from the LUT 211 and its input-output characteristics are set such that (1−Sc) is output in response to the input Sc, as shown in FIG. 8. This arrangement can provide the same effect.

The ninth embodiment in which a circuit arrangement is simplified will be described below with reference to FIGS. 26 and 27.

FIG. 26 is a block diagram showing the arrangement of the ninth embodiment. Referring to FIG. 26, the image signal processing apparatus is constituted by a matrix circuit 9, a logarithmic converter 10, a filter 11, a DGC circuit 12, an inverse logarithmic converter 13, delay circuits 14, 15r, 15g, and 15b, subtracters 221r, 221g, and 221b for subtracting an output Y from the delay circuit 14 from outputs from the delay circuits 15r, 15g, and 15b, and adders 222r, 222g, and 222b for adding an output Y' from the inverse logarithmic converter 13 to outputs from the subtracters 221r, 221g, and 221b to output R", G", and B".

The operation of the ninth embodiment will be described below with reference to FIGS. 21 and 22 of the above-described eighth embodiment.

Of chrominance signals R, G, and B, the signal R is exemplified. Referring to FIG. 21, R is compressed to become R'. Since the compression coefficient at this time is C=Y'/Y, R' is represented by the following equation.

$$R' = C \times R = (Y'/Y) \times R \qquad (6)$$

The R" signal after color saturation correction is represented as follows in accordance with the above equation (1)

$$R'' = Sc \times R' + (1 - Sc) \times Y \qquad (7)$$

These equations are simplified to obtain the following equation.

$$R'' = Sc \times (Y'/Y) \times R + (1 - Sc) \times Y \qquad (8)$$

Figure 22:
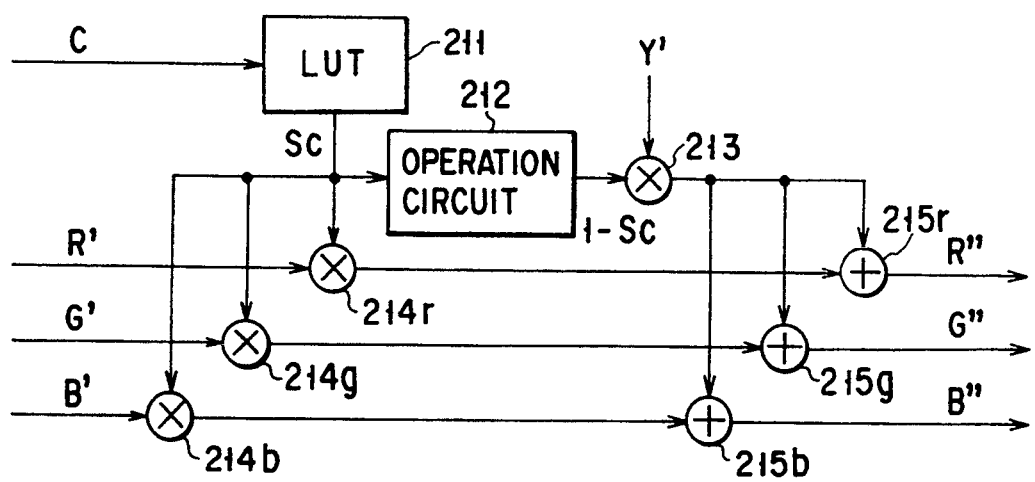
FIG. 22 is a block diagram showing the detailed arrangement of a color saturation correction circuit 21 in FIG. 21.

The LUT 211 in FIG. 22 is set such that a monotone decreasing function of Sc with respect to C=Y'/Y (SC=Y'/Y) can be obtained, as shown in FIG. 27.

More specifically, by substituting Sc=Y'/Y into the above equation (8) and rearranging the obtained equation, the following equation can be obtained.

$$R'' = R + Y' - Y \qquad (9)$$

This also applies to other chrominance signals.

On the other hand, according to the arrangement in FIG. 26, an output in accordance with equation (9) can be obtained. Therefore, the arrangement in FIG. 26 can provide exactly the same effect as in the arrangement in FIGS. 21 and 22 of the eighth embodiment when the input-output characteristics of the LUT 211 are set as shown in FIG. 27.

According to the ninth embodiment, with a very simple circuit arrangement, adaptive color saturation correction can be performed.

The tenth embodiment of the present invention will be described below with reference to FIGS. 28 to 30.

Figure 28:
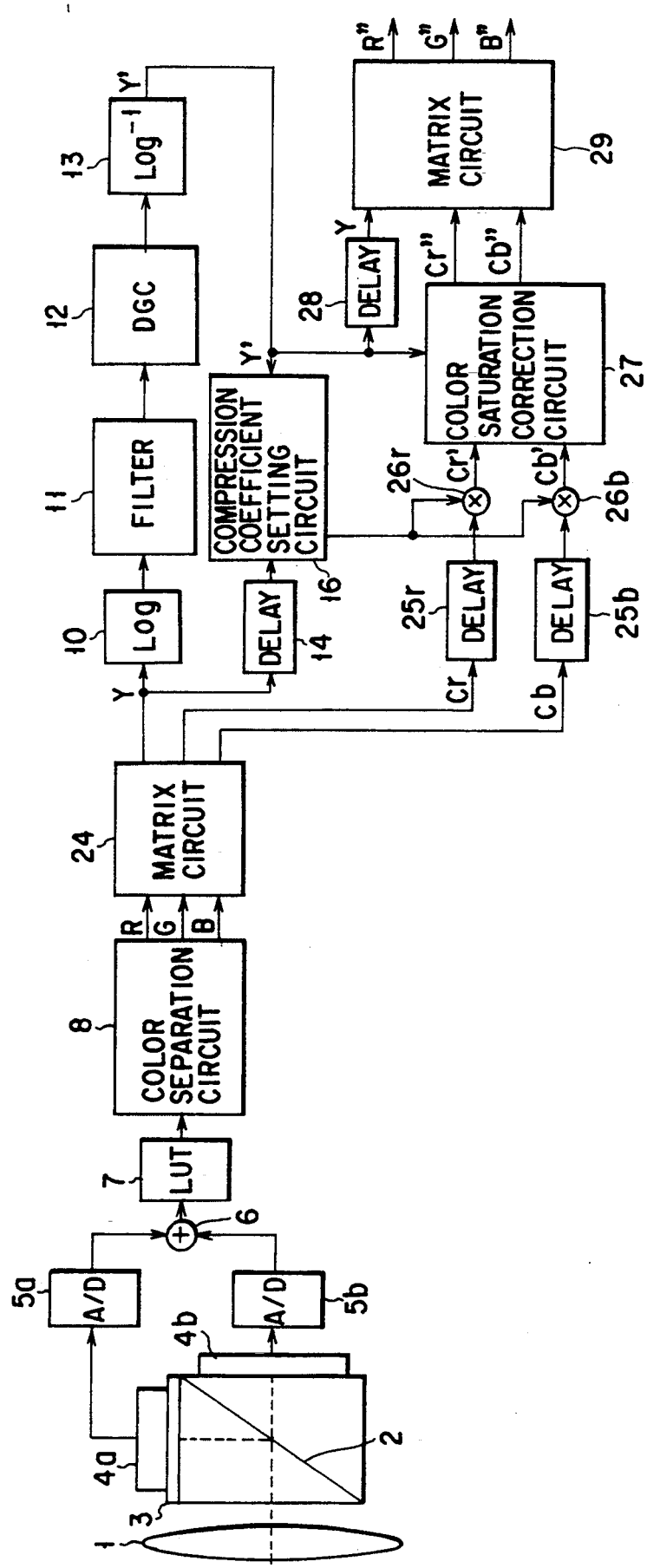
FIG. 28 is a block diagram showing the entire arrangement of the tenth embodiment of the present invention.

FIG. 28 is a block diagram showing the arrangement of the tenth embodiment of the present invention.

Referring to FIG. 28, the image signal processing apparatus is constituted by a photographing optical system 1, a half mirror 2, an ND filter 3, image pickup elements 4a and 4b, A/D converters 5a and 5b, an adder 6, an LUT 7, and a color separation circuit 8. This image signal processing apparatus also comprises a matrix circuit 24 for generating luminance and chrominance signals from outputs from the color separation circuit 8, a logarithmic converter 10, a filter 11, a DGC circuit 12, an inverse logarithmic converter 13, a delay circuit 14 for timing an output from the matrix circuit 24 with an output from the inverse logarithmic converter 13, and a compression coefficient setting circuit 16.

In the tenth embodiment, an input means for inputting chrominance signals R, G, and B is constituted by the matrix circuit 24.

This image signal processing apparatus is also constituted by delay circuits 25r and 25b for timing color difference signal outputs from the matrix circuit 24 with an output from the compression coefficient setting circuit 16, multipliers 26r and 26b for multiplying outputs from the delay circuits 25r and 25b by an output C from the compression coefficient setting circuit 16, a color saturation correction circuit 27 for outputting saturation-corrected signals Cr" and Cb" from outputs Cr' and Cb' from the multipliers 26r and 26b, a delay circuit 28 for timing the outputs Cr" and Cb" from the color saturation correction circuit 27 with Y', and a matrix circuit 29 for outputting saturation-corrected chrominance signals R", G", and B" from the output Y' from the delay circuit 28 and the outputs Cr" and Cb" from the color saturation correction circuit 27.

Figure 29:
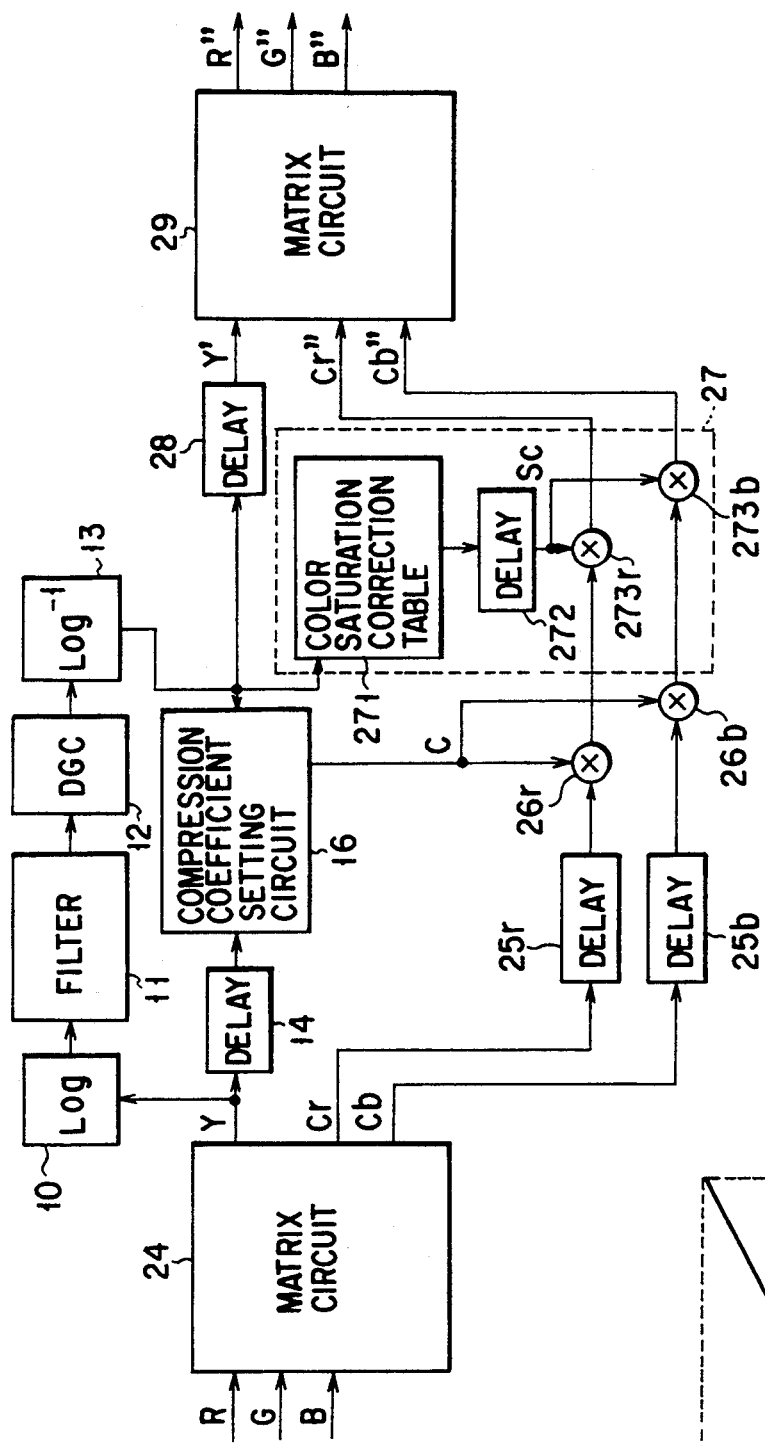
FIG. 29 is a block diagram showing the arrangement of a color saturation correction circuit in FIG. 28 and its periphery.

FIG. 29 is a block diagram showing the arrangement of the color saturation correction circuit 27 and the peripheral circuits.

The color saturation correction circuit 27 is constituted by a color saturation correction table 271 for receiving the compressed luminance signal component Y' to output a color saturation correction coefficient in accordance with the luminance signal Y', a delay circuit 272 for timing a color saturation correction coefficient Sc output from the color saturation correction table 271 with the compressed color difference signals Cr' and Cb' (outputs from the multipliers 26r and 26b), and multipliers 273r and 273b for multiplying the compressed color difference signals Cr' and Cb' (outputs from the multipliers 26r and 26b) by the color saturation correction coefficient Sc output from the delay circuit 272.

The operation of the tenth embodiment will be described below with reference to FIG. 28.

An object image passing through the photographing optical system 1 is divided in two directions by the half mirror 2. One of the images passes through the ND filter 3 to be focused on the image pickup element 4a, output as an analog signal, and converted into a digital signal by the A/D converter 5a. The other of the object images divided by the half mirror 2 passes through the image pickup element 4b to be converted into a digital signal by the A/D converter 5b.

At this point of time, the A/D converter 5a outputs an image signal representing that the dark portion of the object is picked up to become solid black and the bright portion is properly picked up without saturation. On the other hand, the A/D converter 5b outputs an image signal representing that the bright portion is saturated and the dark portion is picked up without becoming solid black. The adder 6 adds these image signals to obtain an image signal having information from the dark portion to the bright portion. Since the input-output characteristics of this image signal are not linear, the image signal is converted by the LUT 7 to have linear characteristics.

The color separation circuit 8 separates the image signal converted to be linear by the LUT 7 into chrominance signals R, G, and B. The matrix circuit 24 converts these signals into the luminance signal Y and the color difference signals Cr and Cb. The luminance signal Y output from the matrix circuit 24 is output as the luminance signal Y', whose dynamic range is compressed, through the logarithmic converter 10, the filter 11, the DGC circuit 12, and the inverse logarithmic converter 13.

The compression coefficient setting circuit 16 obtains a compression coefficient C=Y'/Y from the luminance signal Y timed with the output Y' from the inverse logarithmic converter 13 by the delay circuit 14. The multipliers 26r and 26b multiply the color difference signals Cr and Cb (timed by the delay circuits 25r and 25b) by the compression coefficient C to obtain the color difference signals Cr' and Cb' whose dynamic ranges are compressed while preserving the chromaticity. The color saturation correction circuit 27 corrects the color saturation of these color difference signals Cr' and Cb' to obtain the signals Cr'' and Cb''.

The saturation-corrected color difference signals Cr'' and Cb'' and the compressed luminance signal Y' timed by the delay circuit 28 are simultaneously input to the matrix circuit 29 and converted into the saturation-corrected chrominance signals R'', G'' and B''.

The operation of the color saturation correction circuit 27 as the main part of the tenth embodiment will be described below with reference to FIG. 29.

The luminance signal component Y' input to the color saturation correction circuit 27 is input to the color saturation correction table 271. The multipliers 273r and 273b multiply the color difference signals Cr' and Cb' by the output Sc from the color saturation correction table 271.

The color difference signals are as follows.

$$Cr'' = Sc \times Cr' = Sc \times C \times Cr \quad (10)$$

$$Cb'' = Sc \times Cb' = Sc \times C \times Cb \quad (11)$$

The output Sc from the color saturation correction table 271 takes a value within the range of 0 to 1. As Sc is smaller, the color saturation is suppressed lower. As Sc becomes larger, the color saturation becomes higher. As for the color saturation correction coefficient Sc, when Sc=0, an achromatic color is obtained. When Sc=1, the original color saturation is preserved.

Figure 30:
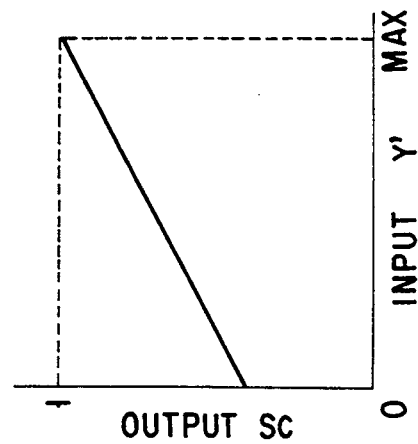
FIG. 30 is a timing chart of an example of the input-output characteristics of a color saturation correction table 271 in FIG. 29.

The input-output characteristics of the color saturation correction table 271 are set to represent a monotone increasing function of the output in response to the input, as shown in FIG. 30. In this case, the color saturation of a dark portion is more intensively suppressed.

As a modification of the tenth embodiment, the arrangement as shown in FIG. 31, in which saturation correction is performed before the chrominance signals are multiplied by the compression coefficient C, can provide the same effect.

More specifically, a color saturation correction table 27a is constituted by the color saturation correction table 271 and the multipliers 273r and 273b. The multipliers 273r and 273b multiply the color difference signals Cr and Cb from the delay circuits 25r and 25b by the output Sc from the color saturation correction table 271. The multipliers 26r and 26b multiply the obtained color difference signals Cr' and Cb' by the output Sc obtained from the color saturation correction table 271 through a delay circuit 30 to obtain the signals Cr'' and Cb''.

In the present invention, the saturation correction before multiplying the signals related to a color by the compression coefficient C, as shown in the above modification, can also be applied to the following embodiments.

As described above, according to the tenth embodiment, the luminance of the output image signal is not changed, and the color saturation at a high luminance portion is not suppressed. As the luminance becomes lower, the color saturation is more intensively suppressed. Therefore, even when the compression ratio of the dynamic range is increased, an excellent color image can be obtained while the color saturation at the low luminance portion does not seem to be emphasized.

In addition, by using the color difference signals, the circuit arrangement is further simplified as compared to the first to ninth embodiments.

The input-output characteristics of the color saturation correction table 271 represent a linear function in FIG. 30. However, the present invention is not limited to this, and various characteristics can be used as far as they represent a monotone increasing function.

The eleventh embodiment of the present invention will be described below.

FIG. 32 is a block diagram showing another arrangement of a color saturation correction circuit.

An output C from a compression coefficient setting circuit 16 and an output Sc from a color saturation correction table 271 are connected to the inputs to a multiplier 274. An output from the multiplier 274 is connected to inputs to multipliers 275r and 275b. Each of outputs Cr and Cb from delay circuits 25r and 25b is connected to the other input to a corresponding one of the multipliers 275r and 275b. Outputs from the multipliers 275r and 275b are input to a matrix circuit 29.

With this arrangement, the color difference signals Cr and Cb output from the matrix circuit 24 and passing through the delay circuits 25r and 25b are multiplied by a product Sc×C of the output C from the compression coefficient setting circuit 16 and the output Sc from the color saturation correction table 271. As a result, the outputs from the multipliers 275r and 275b become Sc×C×Cr and Sc×C×Cb, respectively. It is apparent that these outputs are Cr" and Cb" in accordance with the above equations (10) and (11).

The input-output characteristics of the color saturation correction table 271 are set to represent a monotone increasing function of the output in response to the input, as shown in FIG. 30, as in the above tenth embodiment.

The input-output characteristics of the color saturation correction table 271 represent a linear function in FIG. 30. However, the present invention is not limited to this, and various characteristics can be used as far as they represent a monotone increasing function.

According to the eleventh embodiment, the luminance of the output image signal is not changed, and the color saturation at a high luminance portion is not suppressed. As the luminance becomes lower, the color saturation is more intensively suppressed. Therefore, even when the compression ratio of the dynamic range is increased, an excellent color image can be obtained while the color saturation at a low luminance potion does not seem to be emphasized.

In the eleventh embodiment, the circuit arrangement can be further simplified as compared to the above tenth embodiment.

The twelfth embodiment in which a color saturation correction coefficient is changed in accordance with the compression ratio of the dynamic range of an image will be described below with reference to FIGS. 33 and 34.

Figures 33, 34:
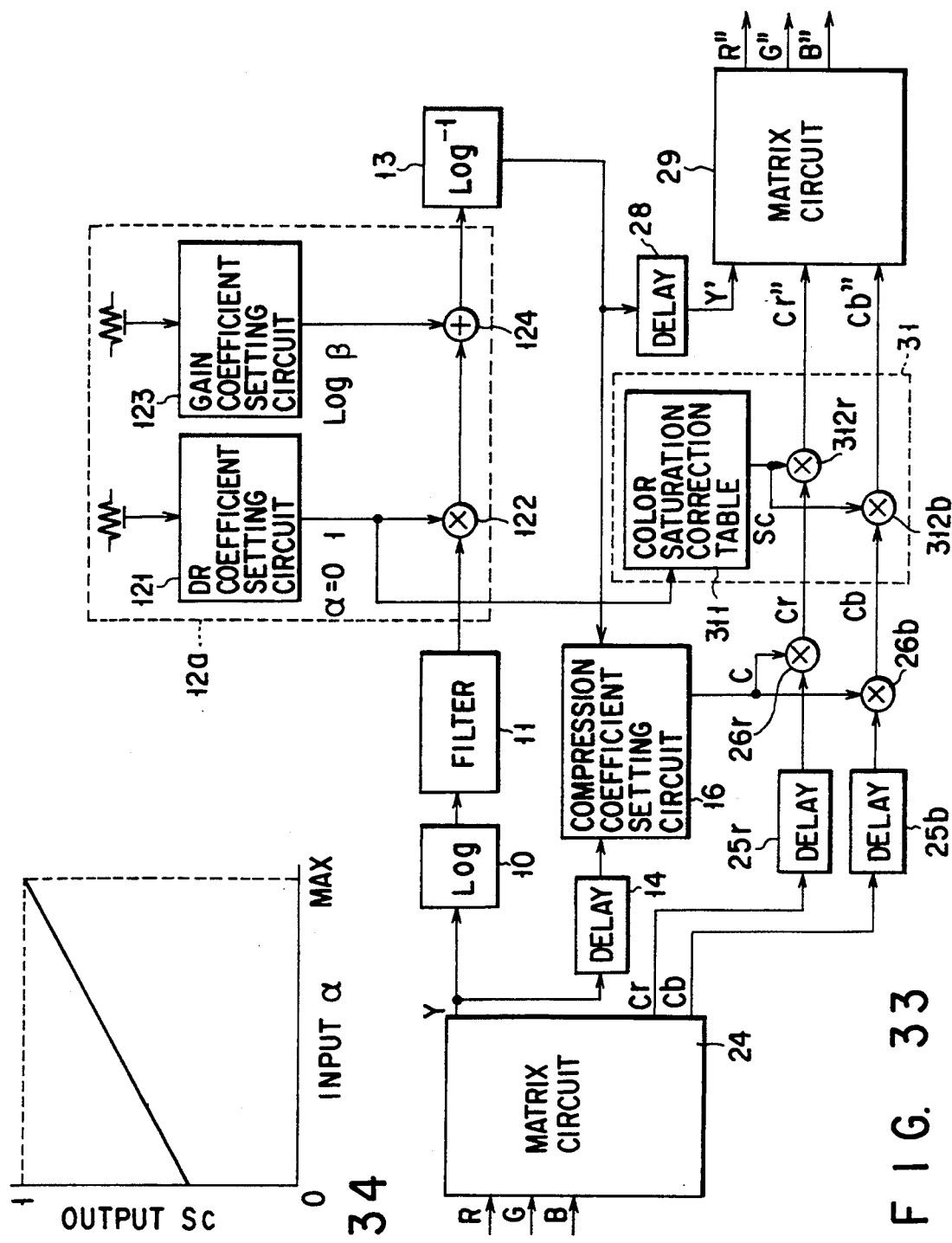
FIG. 33 is a block diagram showing the arrangement of the twelfth embodiment of the present invention.
FIG. 34 is a timing chart of the input-output characteristics of a color saturation correction table 311 in FIG. 33.

FIG. 33 is a block diagram showing the arrangement of the twelfth embodiment.

Referring to FIG. 33, the image signal processing apparatus comprises a matrix circuit 24 for generating a luminance signal Y and color difference signals Cr and Cb from signals R, G, and B, a logarithmic converter 10, a filter 11, a DGC circuit 12a, an inverse logarithmic converter 13, a delay circuit 14, and a compression coefficient setting circuit 16. This image signal processing apparatus is also constituted by delay circuits 25r and 25b, multipliers 26r and 26b, and a color saturation correction circuit 31 for performing saturation correction from outputs Cr' and Cb' from the multipliers 26r and 26b.

As described above, the DGC circuit 12a is constituted by a DR coefficient setting circuit 121, a multiplier 122, a gain coefficient setting circuit 123, and an adder 124.

The color saturation correction circuit 31 is constituted by a color saturation correction table 311 and multipliers 312r and 312b. The color saturation correction circuit 31 receives the outputs Cr' and Cb' from the multipliers 26r and 26b and an output a from the DR coefficient setting circuit 121 in the DGC circuit 12a to output a color saturation correction coefficient Sc in accordance with the dynamic range coefficient α. The multipliers 312r and 312b multiply the compressed color difference signals Cr' and Cb' by the color saturation correction coefficient Sc output from the color saturation correction table 311.

The operation of the twelfth embodiment will be described below.

The luminance signal Y is extracted by the matrix circuit 24 to obtain a luminance signal Y', whose dynamic range is compressed, through the logarithmic converter 10, the filter 11, the DGC circuit 12a, and the inverse logarithmic converter 13. The DGC circuit 12a multiplies α and then adds logβ. Therefore, when the output from the filter is $Y_f$, the compressed luminance signal Y' is represented by the above equation (4).

In this case, α is a value within a range of 0 to 1. Therefore, as the dynamic range coefficient α is smaller, the compression ratio of the dynamic range becomes higher. As the compression ratio of the dynamic range is increased, the color saturation must be intensively corrected. The compression coefficient setting circuit 16 obtains a compression coefficient C=Y'/Y from the output Y' from the inverse logarithmic converter 13 and the luminance signal Y timed by the delay circuit 14. The multipliers 26r and 26b multiply the color difference signals Cr and Cb (timed by the delay circuits 25r and 25b) by the compression coefficient C to obtain the color difference signals Cr' and Cb' whose dynamic ranges are compressed while the color saturation is preserved. The color saturation correction circuit 31 corrects the color saturation of these color difference signals to obtain signals Cr" and Cb".

The operation of the color saturation correction circuit 31 as the main part of the twelfth embodiment will be described below. The dynamic range coefficient α is input to the color saturation correction table 311. The color saturation correction table 311 outputs the color saturation correction coefficient Sc in accordance with the input-output characteristics as shown in FIG. 34. As a changes, the magnitude of Sc changes accordingly. The multipliers 312r and 312b multiply the chrominance signals Cr' and Cb' by the output Sc from the color saturation correction table 311 to be output as Cr" and Cb".

In this case, only the color saturation can be suppressed without changing the luminance Y'.

The output Sc from the color saturation correction table 311 takes a value within a range of 0 to 1. As Sc is smaller, the color saturation is suppressed lower. As Sc becomes larger, the color saturation becomes higher. As for the color saturation correction coefficient Sc, when Sc=0, an achromatic color is obtained when Sc=1, the original color saturation is preserved. Therefore, in order to more intensively suppress the color saturation at a high compression ratio of the dynamic range, the color saturation correction coefficient Sc must be a small value when α is small.

The input-output characteristics of the color saturation correction table 311 are set to represent a monotone increasing function of the output Sc in response to the input a, as shown in FIG. 34. In this case, when the compression ratio of the dynamic range is high, i.e., when a becomes smaller, Sc becomes smaller accordingly. As a result, the color saturation is intensively suppressed.

The input-output characteristics of the color saturation correction table 311 represent a linear function in FIG. 34. However, the present invention is not limited to this, and various characteristics can be used as far as they represent a monotone increasing function.

According to the twelfth embodiment, the luminance of the output image signal is not changed. When the compression ratio is not high, the color saturation is not suppressed. As the compression ratio becomes higher, the color saturation is more intensively suppressed. Therefore, a more excellent color image can be displayed.

In addition, by using the color difference signals, the circuit arrangement can be simplified.

The thirteenth embodiment of the present invention will be described below.

Figure 35:
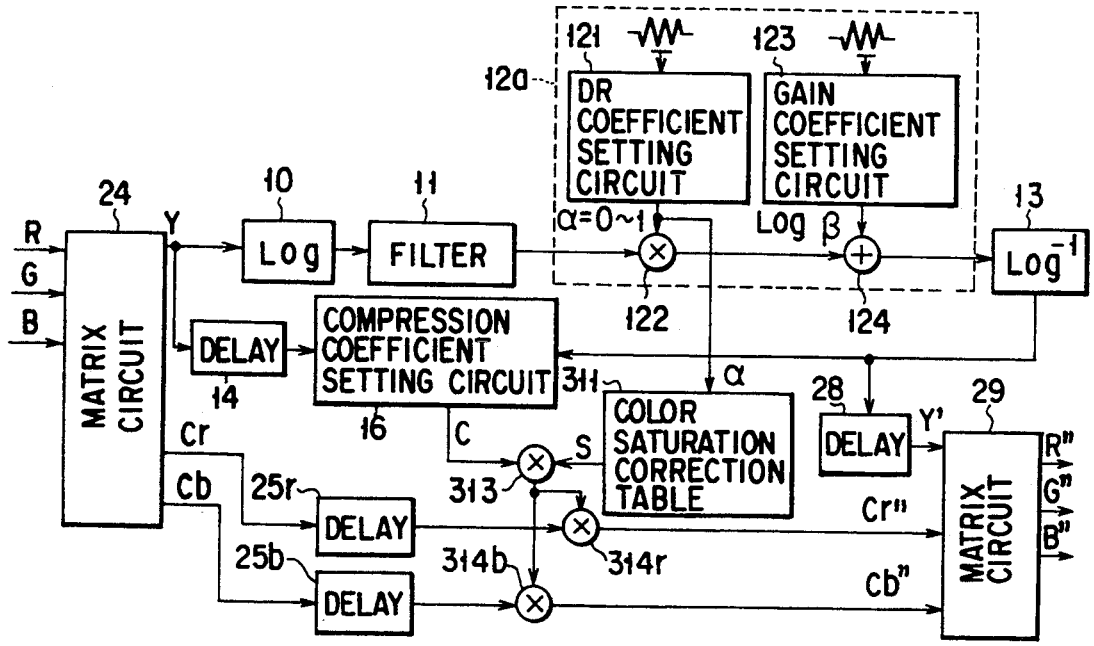
FIG. 35 is a block diagram showing the arrangement of the thirteenth embodiment of the present invention.

FIG. 35 is a block diagram showing the arrangement of the thirteenth embodiment in which a color saturation correction circuit having another arrangement is used. This is a modification of the image signal processing apparatus shown in FIG. 33.

Referring to FIG. 35, an output C from the compression coefficient setting circuit 16 and an output Sc from the color saturation correction table 311 are connected to inputs to a multiplier 313. An output from the multiplier 313 is connected to the inputs to multipliers 314r and 314b. Each of outputs Cr and Cb from delay circuits 25r and 25b is connected to the other input to a corresponding one of the multipliers 314r and 314b. Outputs from the multipliers 314r and 314b are input to a matrix circuit 29.

With this arrangement, the color difference signals Cr and Cb output from the matrix circuit 24 and passing through the delay circuits 25r and 25b are multiplied by a product Sc×C of an output C from the compression coefficient setting circuit 16 and an output Sc from the color saturation correction table 311. As a result, the outputs from the multipliers 314r and 314b become Sc×C×Cr and Sc×C×Cb, respectively. It is apparent that these outputs are Cr" and Cb" in accordance with the above equations (10) and (11).

The input-output characteristics of the color saturation correction table 311 are set to present a monotone increasing function of the output in response to the input, as in the above twelfth embodiment, as shown in FIG. 34. In this case, when the compression ratio of the dynamic range is high, i.e., when a becomes smaller, Sc becomes smaller accordingly. As a result, the color saturation is intensively suppressed.

The input-output characteristics of the color saturation correction table 311 represent a linear function in FIG. 34. However, the present invention is not limited to this, and various characteristics can be used as far as they represent a monotone increasing function.

According to the thirteenth embodiment, the luminance of the output image signal is not changed. When the compression ratio is not high, the color saturation is not suppressed. As the compression ratio becomes higher, the color saturation is more intensively suppressed. Therefore, a more excellent color image can be displayed.

In the thirteenth embodiment, the circuit arrangement is further simplified as compared to the above twelfth embodiment.

The fourteenth embodiment of the present invention will be described below.

Figure 36:
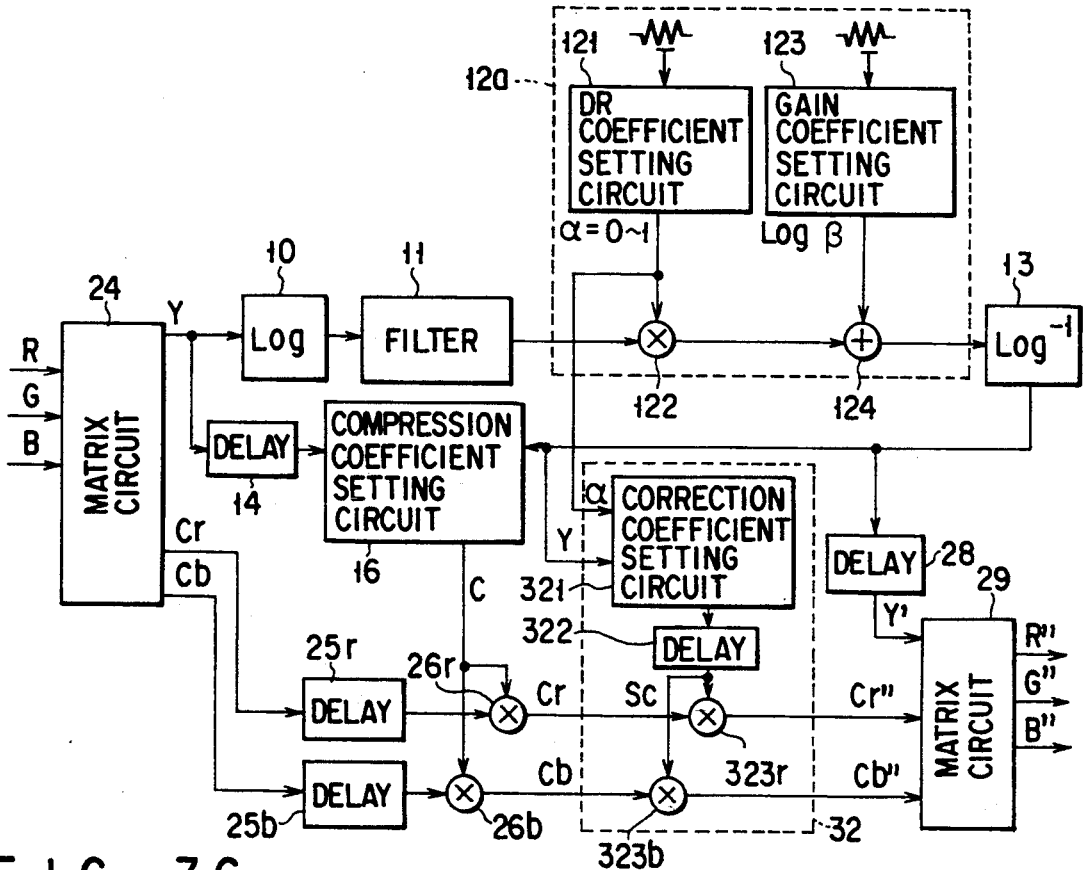
FIG. 36 is a block diagram showing the arrangement of the fourteenth embodiment of the present invention.

FIG. 36 is a block diagram showing the fourteenth embodiment in which a color saturation correction circuit having another arrangement is used. This is another modification of the image signal processing apparatus shown in FIG. 33. It is almost the same as the processing section in FIG. 33 except for the arrangement of the color saturation correction circuit.

Referring to FIG. 36, a color saturation correction circuit 32 is constituted by a correction coefficient setting circuit 321, a delay circuit 322, and multipliers 323r and 323b.

The correction coefficient setting circuit 321 outputs a correction coefficient Sc from an output α from a DR coefficient setting circuit 121 and an output Y from an inverse logarithmic converter 13. The delay circuit 322 times outputs Cr' and Cb' from the multipliers 26r and 26b with the output Sc from the correction coefficient setting circuit 321. The multipliers 323r and 323b multiply the outputs Cr' and Cb' from the multipliers 26r and 26b by the correction coefficient Sc.

The arrangement and operation of the color saturation correction circuit 32 used in the fourteenth embodiment will be described below with reference to FIG. 36.

A luminance signal Y' and a dynamic range coefficient α are input to the correction coefficient setting circuit 321. The correction coefficient setting circuit 321 calculates the color saturation correction coefficient Sc in accordance with equation (12).

$$Sc = (1-\alpha) \times Y' + \alpha \qquad (12)$$

Figures 37, 38:
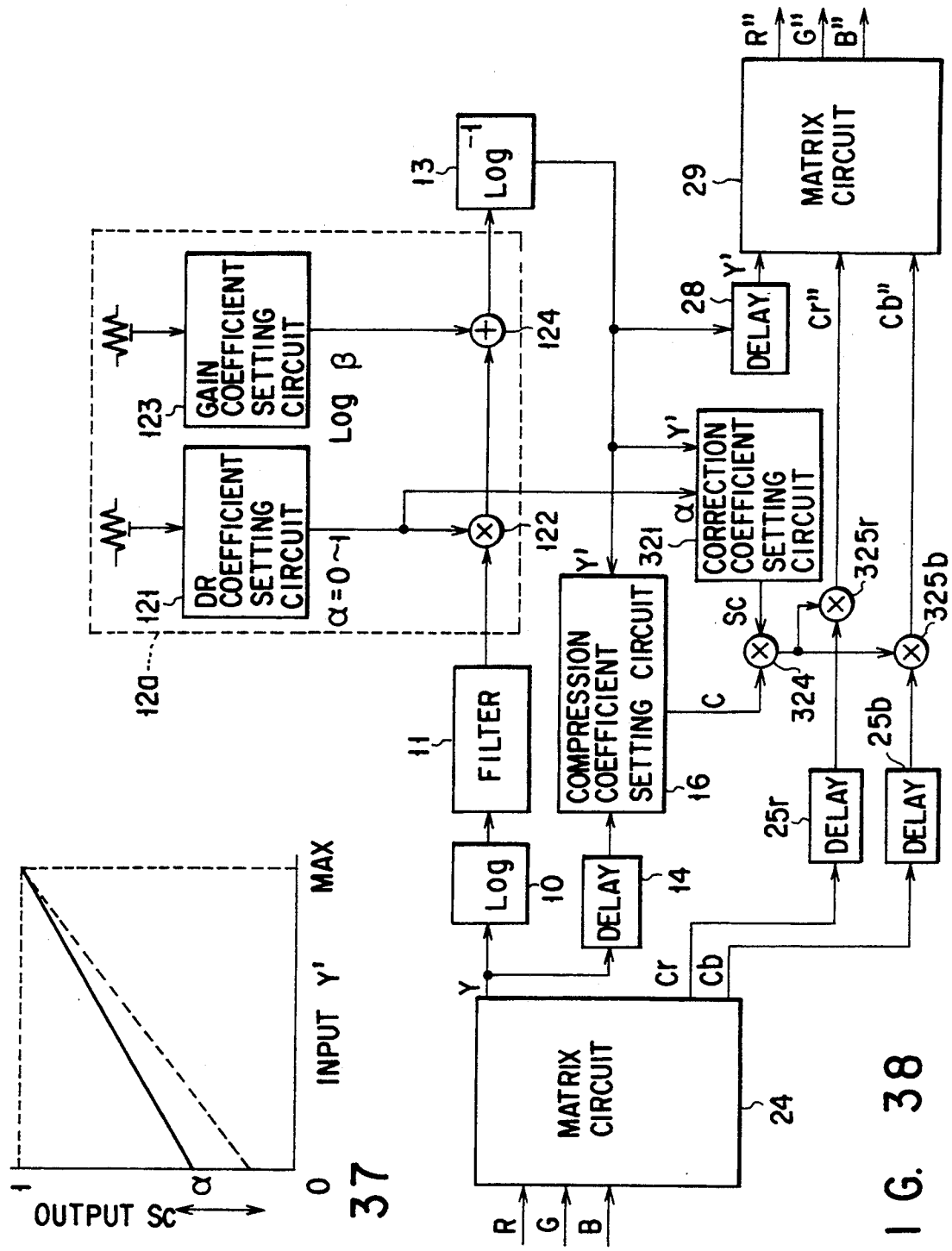
FIG. 37 is a timing chart of the input-output characteristics of a correction coefficient setting circuit in FIG. 36.
FIG. 38 is a block diagram showing the arrangement of the fifteenth embodiment of the present invention.

This represents input-output characteristics as shown in FIG. 37. As Y' and α change, the magnitude of Sc changes accordingly.

The output Sc from the correction coefficient setting circuit 321 is timed by the delay circuit 322. The multipliers 323r and 323b then multiply the color difference signals Cr' and Cb' by the output Sc to output Cr" and Cb". The output Sc from the correction coefficient setting circuit 321 takes a value within a range of 0 to 1. As Sc is smaller, the color saturation is suppressed lower. As Sc becomes larger, the color saturation becomes higher. When Sc=0, an achromatic color is obtained. When Sc=1, the original color saturation is preserved.

The input-output characteristics of the correction coefficient setting circuit 321 represent a monotone increasing function of the output in response to the input. The color saturation at a dark portion is more intensively suppressed. In addition, when the input is 0, the value of Sc is equal to the dynamic range coefficient α. For this reason, when the compression ratio of the dynamic range is high, i.e., when a becomes smaller, Sc becomes smaller accordingly throughout the input. As a result, the color saturation is intensively suppressed throughout the input.

The input-output characteristics of the correction coefficient setting circuit 321 represent a linear function in FIG. 37. However, the present invention is not limited to this, and various characteristics can be used as far as they represent a monotone increasing function.

In the fourteenth embodiment, when the input is 0, the value of Sc is equal to the dynamic range coefficient α. However, a function in which Sc is proportional to α or a function of higher degree of α may also be used.

According to the fourteenth embodiment, the luminance of the output image signal is not changed, and the color saturation at a high luminance portion is not suppressed. As the luminance becomes lower, the color saturation is more intensively suppressed. Therefore, even when the compression ratio of the dynamic range is increased, the color saturation at a low luminance portion does not seem to be emphasized. When the compression ratio is not so high, the color saturation is less intensively suppressed as a whole. As a result, a more excellent color image can be displayed.

In addition, by using the color difference signals, the circuit arrangement is simplified.

The fifteenth embodiment of the present invention will be described below.

FIG. 38 is a block diagram showing the arrangement of the fifteenth embodiment of the present invention in which a color correction circuit having another arrangement is used. This is a modification of the image signal processing apparatus shown in FIG. 36.

Referring to FIG. 38, an output C from a compression coefficient setting circuit 16 and an output Sc from a correction coefficient setting circuit 321 are connected to inputs to a multiplier 324. An output from the multiplier 324 is connected to inputs to multipliers 325r and 325b. Each of outputs Cr and Cb from delay circuits 25r and 25b is connected to the other input to a corresponding one of the multipliers 325r and 325b. Outputs from the multiplier 325r and 325b are connected to an input to a matrix circuit 29.

With this arrangement, the color difference signals Cr and Cb output from the matrix circuit 24 and passing through the delay circuit 25r and 25b are multiplied by a product Sc×C of the output C from the compression coefficient setting circuit 16 and the output Sc from the correction coefficient setting circuit 321. As a result, the outputs from the multipliers 325r and 325b become Sc×C×Cr and Sc×C×Cb, respectively. It is apparent that these outputs are Cr" and Cb" in accordance with the above equations (10) and (11).

The input-output characteristics of the correction coefficient setting circuit 321 represent a monotone increasing function of the output in response to the input, as in the above fourteenth embodiment, as shown in FIG. 37. Therefore, the color saturation at a dark portion is more intensively suppressed. In addition, when the input is 0, the value of Sc is equal to a dynamic range coefficient $\alpha$. For this reason, when the compression ratio of the dynamic range is high, i.e., when $\alpha$ becomes smaller, Sc becomes smaller accordingly throughout the input. As a result, the color saturation is intensively suppressed throughout the input.

In the fifteenth embodiment, when the input is 0, the value of Sc is equal to the dynamic range coefficient $\alpha$. However, a function in which Sc is proportional to $\alpha$ or a function of higher degree of $\alpha$ may also be used.

As described above, according to the fifteenth embodiment, the luminance of the output image signal is not changed, and the color saturation at a high luminance portion is not suppressed. As the luminance becomes lower, the color saturation at a low luminance portion is more intensively suppressed. Therefore, even when the compression ratio of the dynamic range is increased, the color saturation at a low luminance portion does not seem to be emphasized. When the compression ratio is not so increased, the color saturation is less intensively suppressed as a whole. As a result, a more excellent color image can be displayed.

In the fifteenth embodiment, the circuit arrangement is simplified as compared to the above fourteenth embodiment.

The sixteenth embodiment of the present invention will be described below.

Figure 39:
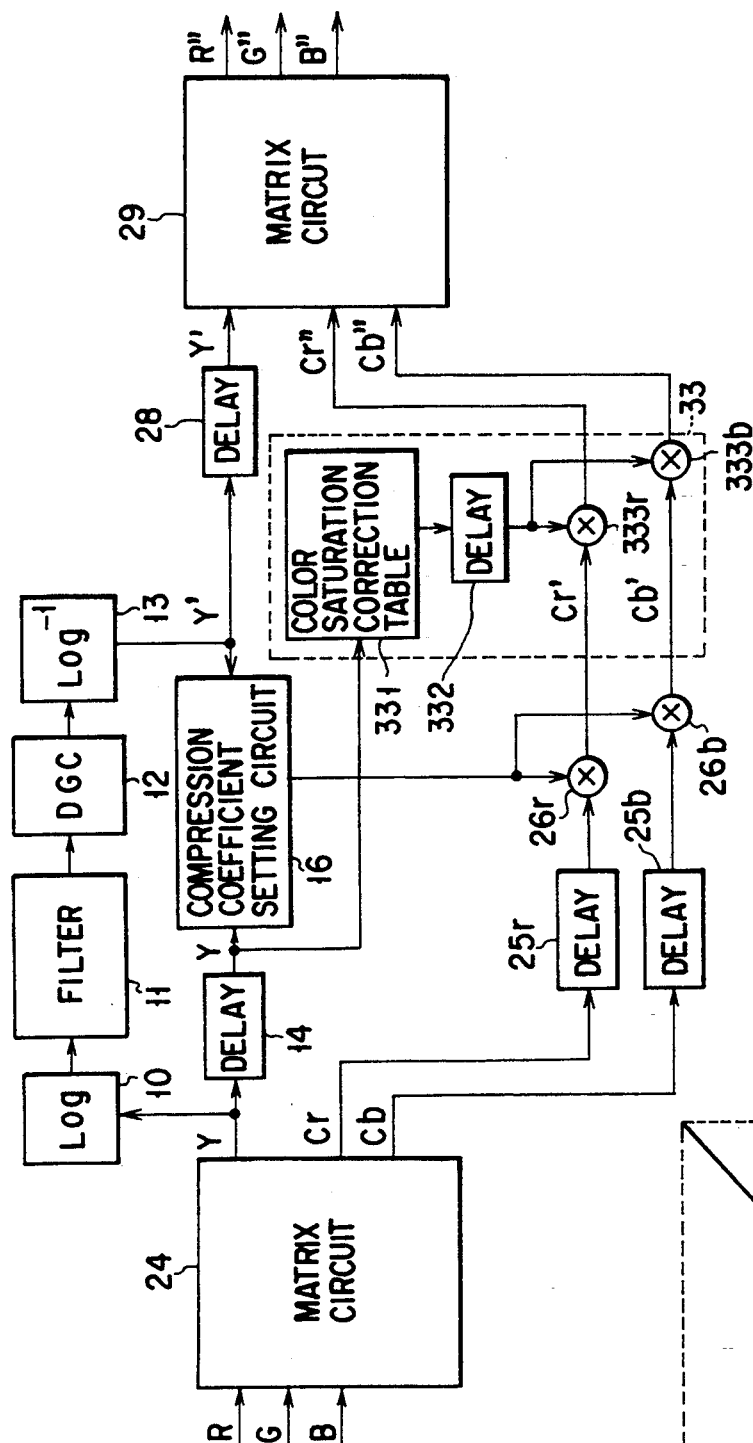
FIG. 39 is a block diagram showing the arrangement of the sixteenth embodiment of the present invention.

FIG. 39 is a block diagram showing the sixteenth embodiment of the present invention in which the image signal processing apparatus in FIG. 29 is modified and a color saturation correction circuit having another arrangement is used. The arrangement in FIG. 39 is almost the same as in FIG. 29 except for the arrangement of the color saturation correction circuit.

Referring to FIG. 39, a color saturation correction circuit 33 is constituted by a color saturation correction table 331 for outputting a correction coefficient Sc from an output Y from a delay circuit 14, a delay circuit 332 for timing outputs Cr' and Cb' from multipliers 26r and 26b with the output Sc from the color saturation correction table 331, and multipliers 333r and 333b for multiplying the outputs Cr' and Cb' from the multipliers 26r and 26b by the correction coefficient Sc.

With this arrangement, the luminance signal Y before compression is input to the color saturation correction table 331. The multipliers 333r and 333b multiply the color difference signals Cr' and Cb' by Sc output from the color saturation correction table 331 and passing through the delay circuit 332 to output Cr" and Cb".

Figure 40:
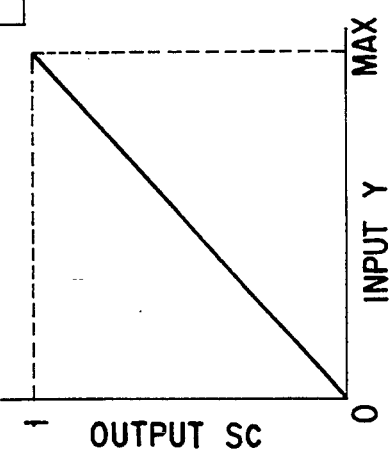
FIG. 40 is a timing chart of the input-output characteristics of a color saturation correction table 331 in FIG. 39.

FIG. 40 is a timing chart of the input-output characteristics of the color saturation correction table 331. As shown in FIG. 40, this characteristics represent a monotone increasing function of the output in response to the input.

In this embodiment, the input-output characteristics of the color saturation correction table 331 represent a linear function. However, a function of higher degree, exponential function, or logarithmic function may also be used.

When the dynamic range of the input is wide, data having smaller values with respect to the maximum value of the data are present in output data, and the compression ratio must be increased. To the contrary, when the dynamic range is narrow, data having values smaller than a predetermined value are not present, and the compression ratio is decreased. On the other hand, a dark portion at a high compression ratio corresponds to a portion having a small input value before compression. Therefore, when the color saturation correction coefficient Sc with respect to the luminance signal Y before compression is set as shown in FIG. 40, the color saturation at a dark portion can be suppressed when the compression ratio is high.

According to the sixteenth embodiment, the color saturation correction coefficient can be determined regardless of the compression ratio. A simple circuit arrangement without a complicated coefficient setting circuit can be obtained, thereby realizing adaptive color saturation correction.

In addition, by using the color difference signals, the circuit arrangement is further simplified.

The seventeenth embodiment of the present invention will be described.

FIG. 41 is a block diagram showing the seventeenth embodiment of the present invention in which the image signal processing apparatus in FIG. 38 is modified and a color saturation correction circuit having another arrangement is used.

Referring to FIG. 41, an output C from a compression coefficient setting circuit 16 and an output Sc from a color saturation correction table 331 are connected to inputs to a multiplier 334. An output from the multiplier 334 is connected to inputs to a multipliers 335r and 335b. Each of outputs Cr and Cb from delay circuit 25r and 25b is connected to the other input to a corresponding one of the multipliers 335r and 335b. Outputs from the multipliers 335r and 335b are input to a matrix circuit 29.

With this arrangement, the color difference signals Cr and Cb output from the matrix circuit 24 and passing through the delay circuit 25r and 25b are multiplied by a product Sc×C of the output C from the compression coefficient setting circuit 16 and the output Sc from the correction coefficient setting circuit 321. As a result, the outputs from the multipliers 325r and 325b become Sc×C×Cr and Sc×C×Cb, respectively. It is apparent that these outputs are Cr" and Cb" in accordance with the above equations (10) and (11).

When the dynamic range of the input is wide, data having smaller values with respect to the maximum value of the data are present in output data, and the compression ratio must be increased. To the contrary, when the dynamic range is narrow, data having values smaller than a predetermined value are not present, and the compression ratio is decreased. On the other hand, a dark portion at a high compression ratio corresponds to a portion with a small input value before compression. Therefore, when the color saturation correction coefficient Sc with respect to the luminance signal Y before compression is set as shown in FIG. 40, the color saturation at a dark portion can be suppressed when the compression ratio is high.

According to the seventeenth embodiment, the luminance of the output image signal is not changed. When the compression ratio is not high, the color saturation is not suppressed. As the compression ratio becomes higher, the color saturation is more intensively suppressed. Therefore, a more excellent color image can be displayed.

In the seventeenth embodiment, the circuit arrangement is further simplified as compared to the sixteenth embodiment.

The eighteenth embodiment of the present invention will be described below.

FIG. 42 is a block diagram showing the eighteenth embodiment of the present invention in which the image signal processing apparatus in FIG. 29 is modified. The arrangement of the image signal processing apparatus in FIG. 42 is almost the same as in FIG. 29 except for the arrangement of a color saturation correction circuit.

A color saturation correction circuit 34 is constituted by a color saturation correction table 341 for outputting a correction coefficient Sc from an output C from a compression coefficient setting circuit 16, a delay circuit 342 for timing outputs Cr' and Cb' from multipliers 26r and 26b with the output Sc from the color saturation correction table 341, and multipliers 343r and 343b for multiplying the output Cr' and Cb' from the multipliers 26r and 26b by the correction coefficient Sc.

With this arrangement, the output C from the compression coefficient setting circuit 16 is input to the color saturation correction table 341. The multipliers 343r and 343b multiply the color difference signals Cr' and Cb' by Sc output from the color saturation correction table 341 and passing through the delay circuit 342 to output Cr" and Cb".

The input-output characteristics of the color saturation correction table represent a monotone decreasing function of the output Sc in response to the input C=Y'/Y, as shown in FIG. 43.

When the dynamic range of the input is wide, data having smaller values with respect to the maximum value of the data are present in output data, and the compression ratio must be increased. At this time, the compression coefficient C=Y'/Y, which is a ratio of a luminance signal Y before compression and a compressed luminance signal Y' in image data having a small value, becomes a large value. In image data having a large value, c=Y'/Y becomes a small value. To the contrary, when the dynamic range is narrow and the compression ratio is decreased, C=Y'/Y becomes a small value throughout the input. Therefore, when the color saturation correction coefficient Sc is set with respect to C=Y'/Y, which is the ratio of the luminance signal Y before compression to the compressed luminance signal Y', as shown in FIG. 15, the color saturation at a dark portion can be suppressed at a high compression ratio.

In this embodiment, the input-output characteristics of the color saturation correction table 341 represent a linear function. However, a function of higher degree, exponential function, or logarithmic function may also be used.

As described above, according to the eighteenth embodiment, the color saturation correction coefficient can be determined regardless of the compression ratio, thereby realizing proper color saturation correction.

In addition, in the eighteenth embodiment, by using the color difference signals, the circuit arrangement is further simplified.

The nineteenth embodiment of the present invention will be described below.

FIG. 44 is a block diagram showing the arrangement of the nineteenth embodiment of the present invention in which the image signal processing apparatus in FIG. 42 is modified.

An output C from a compression coefficient setting circuit 16 is input to a delay circuit 344 to be timed with an output Sc from a color saturation correction table 341. The output C from the delay circuit 344 and the output Sc from the color saturation correction table 341 are connected to inputs to a multiplier 345. An output from the multiplier 345 is connected to inputs to multipliers 346r and 346b. Each of outputs Cr and Cb from delay circuits 25r and 25b is connected to the other input to a corresponding one of the multipliers 346r and 346b. The outputs from the multipliers 346r and 346b are input to a matrix circuit 29.

With this arrangement, the color difference signals Cr and Cb output from the matrix circuit 24 and passing through the delay circuit 25r and 25b are multiplied by a product Sc×C of the output C from the compression coefficient setting circuit 16 and the output Sc from the color saturation correction table 341. As a result, the outputs from the multipliers 26r and 26b become Sc×C×Cr and Sc×C×Cb, respectively. It is apparent that these outputs are Cr" and Cb" in accordance with the above equations (10) and (11).

The input-output characteristics of the color saturation correction table 341 represent a monotone decreasing function of the output Sc in response to the input C=Y'/Y, as shown in FIG. 43.

When the dynamic range of the input is wide, data having smaller values with respect to the maximum value of the data are present in output data, and the compression ratio must be increased. At this time, the compression coefficient C=Y'/Y, which is a ratio of a luminance signal Y before compression and a compressed luminance signal Y' in image data having a small value, becomes a large value. In image data having a large value, C=Y'/Y becomes a small value. To the contrary, when the dynamic range is narrow and the compression ratio is decreased, C=Y'/Y becomes a small value throughout the input. Therefore, when the color saturation correction coefficient Sc is set with respect to C=Y'/Y, which is the ratio of the luminance signal Y before compression to the compressed luminance signal Y' as shown in FIG. 43, the color saturation at a dark portion can be suppressed at a high compression ratio.

In this embodiment, the input-output characteristics of the color saturation correction table 341 represent a linear function. However, a function of higher degree, exponential function, or logarithmic function may also be used.

As described above, according to the nineteenth embodiment, the color saturation correction coefficient can be determined in accordance with the compression ratio of each pixel, thereby realizing proper color saturation correction.

In the nineteenth embodiment, the circuit arrangement is further simplified as compared to the above eighteenth embodiment.

The twentieth embodiment in which a circuit arrangement is further simplified will be described below with reference to FIG. 45.

FIG. 45 is a block diagram showing the arrangement of the twentieth embodiment of an image signal processing apparatus of the present invention.

This image signal processing apparatus comprises a matrix circuit 24, a logarithmic converter 10, a filter 11, a DGC circuit 12, an inverse logarithmic converter 13, a delay circuit 14, and a compression coefficient setting circuit 16.

This apparatus is also constituted by a color saturation correction table 351 for receiving an output C from the compression coefficient setting circuit 16 to output a product of a color saturation correction coefficient Sc and the compression coefficient C, delay circuits 25r and 25b for timing the output from the color saturation correction table 351 with the color difference signal outputs from the matrix circuit 24, multipliers 352r and 352b for multiplying outputs Cr and Cb from the delay circuits 25r and 25b by the output from the color saturation correction table 351, a delay circuit 28 for timing an output Y' from the inverse logarithmic converter 13 with outputs Cr" and Cb" from the multipliers 352r and 352b, and a matrix circuit 29 for outputting chrominance signals R", G", and B" from the luminance signal Y' output from the delay circuit 28 and the color difference signals Cr" and Cb" output from the multipliers 352r and 352b. In the twentieth embodiment, the arrangement from a photographing optical system 1 to a color separation circuit 8 (none are shown) arranged before the matrix circuit 24 is the same as in the image signal processing apparatus in FIG. 28, and a detailed description thereof will be omitted.

In the twentieth embodiment, the input-output characteristics of the color saturation correction table 351 are set as shown in FIG. 46. In this case, the output is C×Sc in response to the input C (Sc is defined by the characteristics in FIG. 43). Therefore, the outputs from the multipliers 352r and 352b become Cr×C×Sc=Cr" and Cb×C×Sc=Cb", respectively, which are the same as in the above eighteenth embodiment.

According to the twentieth embodiment, with a very simple circuit arrangement, the color saturation correction coefficient can be determined in accordance with the compression ratio of each pixel, thereby realizing proper color saturation correction.

The twenty-first embodiment in which no multiplier is used will be described with reference to FIG. 47.

FIG. 47 is a block diagram showing the arrangement of the twenty-first embodiment of an image signal processing apparatus of the present invention.

Referring to FIG. 47, this image signal processing apparatus comprises a matrix circuit 24, a logarithmic converter 10, logarithmic converters 36r and 36b for logarithmically converting color difference signals Cr and Cb, a filter 11 for suppressing low-frequency components of a logarithmically converted luminance signal logY, a DGC circuit 12, a delay circuit 14 for timing the output logY from the logarithmic converter 10 with an output logY' from the DGC circuit 12, and a compression coefficient setting circuit 37 for outputting a difference between the output logY from the delay circuit 14 and the output logY' from the DGC circuit 12, i.e., logY − logY' = log(Y'/Y) = logC.

This apparatus also comprises a color saturation correction table 353 for outputting a coefficient obtained by adding a color saturation correction coefficient to the output logC from the compression coefficient setting circuit 37, delay circuits 25r and 25b for timing the outputs from the logarithmic converters 36r and 36b with the output from the color saturation correction table 353, adders 354r and 354b for adding the output from the color saturation correction table 353 to the outputs from the delay circuits 25r and 25b, and inverse logarithmic converters 38r and 38b for performing inverse logarithmic conversion of the outputs from the adders 354r and 354b.

This apparatus also comprises a delay circuit 28 for timing the output logY' from the DGC circuit 12 with the outputs from the adders 354r and 354b, an inverse logarithmic converter 13, and a matrix circuit 29 for outputting chrominance signals R", G" and B" from the luminance signal Y' output from the inverse logarithmic converter 13 and the color difference signals Cr" and Cb" output from the inverse logarithmic converters 38r and 38b.

In the twenty-first embodiment, the compression coefficient is output in the form of logarithm (logC). Accordingly, the output from the color saturation correction table 353 also takes the form of logarithm {log(C×Sc)}. The adders 354r and 354b add the output from the color saturation correction table 353 to the color difference signals in the form of logarithm. The inverse logarithmic converters 38r and 38b perform inverse logarithmic conversion of the outputs from the adders 354r and 354b to obtain the saturation-corrected color difference signals Cr" and Cb". The logarithmic converter or inverse logarithmic converter can be easily constituted by a memory such as a ROM or RAM. Since no multiplier is used, the circuit arrangement is simplified.

As described above, according to the twenty-first embodiment, with a very simple circuit arrangement, the color saturation correction coefficient can be determined in accordance with the compression ratio of each pixel, thereby realizing proper color saturation correction.

The image signal processing apparatus of the present invention is not limited to the above-described embodiments. As is apparent, the present invention can be applied to combinations or modifications of the embodiments as well as any apparatus incorporating the concept of the present invention.

As has been described above, according to the present invention, color saturation is adaptively corrected in accordance with information obtained from image data. Therefore, even when the compression ratio variously changes upon compression of the dynamic range of a color image, an excellent image can be displayed with a natural color tone from low luminance data to high luminance data.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An image signal processing apparatus comprising:
   input means for inputting an image signal including signals related to colors, said input means including means for outputting a luminance signal in the image signal;
   dynamic range compressing means for compressing a dynamic range of the luminance signal from said input means;
   compression coefficient setting means for obtaining a compression coefficient from a relationship between an output from said dynamic range compressing means and the luminance signal from said input means;
   operating means for executing an operation for compressing dynamic ranges of the signals related to colors in accordance with the compression coefficient from said compression coefficient setting means; and
   color saturation correcting means for substantially correcting color saturation of the signals related to colors of one of a signal input to said operating means and a signal output from said operating means.

2. An apparatus according to claim 1, wherein:
   said input means includes a matrix circuit for receiving chrominance signals to generate at least a luminance signal,
   said dynamic range compressing means compresses a dynamic range of the luminance signal from said matrix circuit,
   said compression coefficient setting means obtains a compression coefficient from a relationship between an output from said dynamic range compressing means and the luminance signal from said matrix circuit,
   said operating means executes an operation for compressing a dynamic range of each chrominance signal in accordance with the compression coefficient from said compression coefficient setting means, and
   said color saturation correcting means is coupled to said operating means and corrects color saturation of each chrominance signal whose dynamic range is compressed by said operating means.

3. An apparatus according to claim 1, wherein:
   said input means includes a matrix circuit for receiving chrominance signals to generate at least a luminance signal,
   said dynamic range compressing means compresses a dynamic range of the luminance signal from said matrix circuit,
   said compression coefficient setting means obtains a compression coefficient from a relationship between an output from said dynamic range compressing means and the luminance signal from said matrix circuit,
   said color saturation correcting means corrects color saturation of each chrominance signal, and
   said operating means compresses a dynamic range of each chrominance signal, whose color saturation is corrected by said color saturation correcting means, in accordance with the compression coefficient from said compression coefficient setting means.

4. An apparatus according to claim 1, wherein:
   said input means includes a matrix circuit for receiving chrominance signals to generate at least color difference signals and a luminance signal,
   said dynamic range compressing means compresses a dynamic range of the luminance signal from said matrix circuit,
   said compression coefficient setting means obtains a compression coefficient from a relationship between an output from said dynamic range compressing means and the luminance signal from said matrix circuit,
   said operating means executes an operation for compressing a dynamic range of each color difference signal from said matrix circuit in accordance with the compression coefficient from said compression coefficient setting means, and
   said color saturation correcting means corrects color saturation of each color difference signal whose dynamic range is compressed by said operating means.

5. An apparatus according to claim 1, wherein:
   said input means includes a matrix circuit for receiving chrominance signals to generate at least color difference signals and a luminance signal,
   said dynamic range compressing means compresses a dynamic range of the luminance signal from said matrix circuit,
   said compression coefficient setting means obtains a compression coefficient from a relationship between an output from said dynamic range compressing means and the luminance signal from said matrix circuit,
   said color saturation correcting means corrects color saturation of each color difference signal from said matrix circuit, and
   said operating means compresses a dynamic range of each color difference signal, whose color saturation is corrected by said color saturation correcting means, in accordance with the compression coefficient from said compression coefficient setting means.

6. An apparatus according to any one of claims 1 to 5, wherein said color saturation correcting means adaptively sets a correction amount of the color saturation in accordance with a magnitude of a compression ratio of the dynamic range by said dynamic range compressing means.

7. An apparatus according to any one of claims 1 to 5, wherein said color saturation correcting means adaptively sets a correction amount of the color saturation in accordance with a magnitude of each pixel signal of the image signal.

8. An apparatus according to any one of claims 1 to 5, wherein said color saturation correcting means adaptively sets a correction amount of the color saturation in accordance with a magnitude of each pixel signal of the image signal and a magnitude of a compression ratio of the dynamic range by said dynamic range compressing means.

9. An apparatus according to any one of claims 1 to 5, wherein said color saturation correcting means adaptively sets a correction amount of the color saturation of each pixel of the image signal in accordance with a magnitude of an output from said compression coefficient setting means.

10. An image signal processing apparatus comprising:
input means for inputting an image signal including signals related to colors, said input means including means for outputting a luminance signal in the image signal;
dynamic range compressing means for compressing a dynamic range of the luminance signal from said input means;
compression coefficient setting means for obtaining a compression coefficient from a relationship between an output from said dynamic range compressing means and the luminance signal from said input means;
coefficient converting means for converting an output from said compression coefficient setting means into a coefficient including a color saturation correction coefficient; and
operating means for operating on an output from said coefficient converting means and the signals related to colors.

11. An apparatus according to claim 10, wherein said input means includes a matrix circuit for generating color difference signals and a luminance signal.

12. An apparatus according to claim 10 or 11, wherein said coefficient converting means adaptively sets a correction coefficient of the color saturation in accordance with a magnitude of a compression ratio of the dynamic range by said dynamic range compressing means.

13. An apparatus according to claim 10 or 11, wherein said coefficient converting means adaptively sets a correction coefficient of the color saturation in accordance with a magnitude of each pixel signal of the image signal.

14. An apparatus according to claim 10 or 11, wherein said coefficient converting means adaptively sets a correction coefficient of the color saturation in accordance with a magnitude of each pixel signal of the image signal and a magnitude of a compression ratio of the dynamic range by said dynamic range compressing means.

15. An apparatus according to claim 10 or 11, wherein said coefficient converting means adaptively sets a correction coefficient of the color saturation of each pixel of the image signal in accordance with a magnitude of an output from said compression coefficient setting means.

* * * * *